US00RE38949E

(19) United States
(12) Reissued Patent
Wright et al.

(10) Patent Number: US RE38,949 E
(45) Date of Reissued Patent: Jan. 31, 2006

(54) UPRIGHT VACUUM CLEANER WITH CYCLONIC AIRFLOW

(75) Inventors: Michael F. Wright, Stow, OH (US); Charles J. Thur, Broadview Hts., OH (US); Mark E. Cipolla, Chardon, OH (US); Brett A. Latimer, New Castle, PA (US); Paul D. Stephens, Twinsburg, OH (US)

(73) Assignee: Royal Appliance Mfg. Co., Glenwillow, OH (US)

(21) Appl. No.: 10/074,615

(22) Filed: Feb. 12, 2002

Related U.S. Patent Documents

Reissue of:
(64) Patent No.: 6,026,540
Issued: Feb. 22, 2000
Appl. No.: 09/122,541
Filed: Jul. 24, 1998

U.S. Applications:
( 63) Continuation-in-part of application No. 09/004,999, filed on Jan. 9, 1998, now Pat. No. 6,003,196.

(51) Int. Cl.
*A47L 9/10* (2006.01)
*A47L 9/16* (2006.01)

(52) U.S. Cl. ..... 15/347; 15/353; 55/337; 55/DIG. 3

(58) Field of Classification Search ..... 15/347, 15/353, 352; 55/337, 523, 528, 379, DIG. 2, 55/DIG. 3
See application file for complete search history.

(56) References Cited

U.S. PATENT DOCUMENTS

| | | | |
|---|---|---|---|
| 930,125 | A | 8/1909 | Barrett |
| 1,003,844 | A | 9/1911 | Winans et al. |

(Continued)

FOREIGN PATENT DOCUMENTS

| | | | |
|---|---|---|---|
| CN | 99240614.5 | | 10/1999 |
| EP | 0 042 723 | | 8/1985 |
| EP | 0 489 468 | A1 | 6/1992 |
| FR | 1468142 | | 2/1967 |
| GB | 479455 | | 2/1938 |
| GB | 1049292 | * | 11/1966 |
| GB | 1111074 | | 4/1968 |
| GB | 2 246 717 | A | 2/1992 |
| GB | 2 265 096 | A * | 9/1993 |
| GB | 2 280 388 | A * | 2/1995 |
| JP | 3-103059 | | 4/1991 |
| JP | H3-10307 | | 10/1991 |
| WO | WO 84/02282 | * | 6/1984 |
| WO | WO 99/30602 | | 6/1999 |
| WO | WO 99/30604 | | 6/1999 |
| WO | WO 99/30605 | | 6/1999 |

*Primary Examiner*—Terrence R. Till
(74) *Attorney, Agent, or Firm*—Fay, Sharpe, Fagan, Minnich & McKee, LLP

(57) ABSTRACT

An upright vacuum cleaner (A) includes an upright housing section (B) and a nozzle section (C). A cyclonic airflow dirt and dust separating chamber (54) is defined in said upright housing section. A suction source (E) pulls air and entrained dirt, dust, and other contaminants through a main suction opening (26) formed in the underside (24) of the nozzle and into the cyclonic airflow chamber (54). The cyclonic airflow chamber causes the suction airstream to travel in a cyclonic path such that the entrained contaminants are separated therefrom and deposited into a dirt container (52) that defines the lower portion of the chamber (54). A main filter element (11) filters residual contaminants from the suction airstream between the chamber and the suction source. The main filter element is preferably made from high-density polyethylene porous filter media. A final filter assembly (F) filters the section airstream discharged by the suction source to ensure that the air discharged into the atmosphere is contaminant free, including those contaminants introduced into the airstream by the suction source itself.

65 Claims, 20 Drawing Sheets

U.S. PATENT DOCUMENTS

| | | | | |
|---|---|---|---|---|
| 1,029,562 | A | | 6/1912 | Prentiss |
| 1,133,543 | A | | 3/1915 | Duffie |
| 1,167,219 | A | | 1/1916 | Replogle |
| 1,768,617 | A | | 7/1930 | Lee |
| 1,887,600 | A | | 11/1932 | Replogle |
| 2,019,895 | A | | 11/1935 | Dow |
| 2,171,248 | A | | 8/1939 | Van Berkel |
| 2,187,164 | A | | 1/1940 | Leathers |
| 2,266,075 | A | | 12/1941 | Replogle |
| 2,316,836 | A | * | 4/1943 | Breuer |
| 2,394,923 | A | * | 2/1946 | Little |
| 2,475,808 | A | | 7/1949 | Storm, Jr. |
| 2,507,897 | A | * | 5/1950 | Gavagnin |
| 2,516,707 | A | * | 7/1950 | Lewyt et al. |
| 2,524,117 | A | | 10/1950 | Storm, Jr. |
| 2,542,634 | A | | 2/1951 | Davis et al. |
| 2,564,339 | A | | 8/1951 | Nerheim |
| 2,643,733 | A | | 6/1953 | Shellman |
| 2,648,396 | A | | 8/1953 | Kirby |
| 2,921,646 | A | * | 1/1960 | Poole |
| 3,177,635 | A | * | 4/1965 | Cawl et al. |
| 3,320,727 | A | * | 5/1967 | Farley et al. |
| 3,413,779 | A | | 12/1968 | Takahashi et al. |
| 3,543,325 | A | | 12/1970 | Hamrick |
| 3,626,545 | A | | 12/1971 | Sparrow |
| 3,797,064 | A | * | 3/1974 | MacFarland |
| 3,820,310 | A | * | 6/1974 | Fromknecht et al. |
| 3,853,518 | A | | 12/1974 | Tu et al. |
| 3,910,781 | A | * | 10/1975 | Bryant, Jr. |
| 4,072,483 | A | * | 2/1978 | Doyle, Jr. |
| 4,108,778 | A | * | 8/1978 | Lambert et al. |
| 4,118,208 | A | * | 10/1978 | Klinedinst |
| 4,172,710 | A | * | 10/1979 | van der Molen |
| 4,198,726 | A | * | 4/1980 | Powell, Jr. |
| 4,268,288 | A | * | 5/1981 | Coombs |
| 4,276,070 | A | * | 6/1981 | Hug |
| 4,284,422 | A | * | 8/1981 | Ferland |
| 4,355,434 | A | * | 10/1982 | Gongwer |
| 4,373,228 | A | * | 2/1983 | Dyson |
| 4,426,211 | A | | 1/1984 | Ataka et al. |
| 4,443,235 | A | * | 4/1984 | Brenholt et al. |
| 4,457,043 | A | * | 7/1984 | Oeberg et al. |
| 4,486,206 | A | * | 12/1984 | Miyakawa et al. |
| 4,571,772 | A | * | 2/1986 | Dyson |
| 4,573,236 | A | * | 3/1986 | Dyson |
| 4,581,787 | A | | 4/1986 | Torigoe et al. |
| 4,593,429 | A | * | 6/1986 | Dyson |
| 4,643,748 | A | * | 2/1987 | Dyson |
| 4,665,582 | A | | 5/1987 | Richmond et al. |
| 4,718,924 | A | * | 1/1988 | DeMarco |
| RE32,751 | E | | 9/1988 | Joss et al. |
| 4,769,052 | A | * | 9/1988 | Kowalski |
| 4,826,515 | A | * | 5/1989 | Dyson |
| 4,853,008 | A | * | 8/1989 | Dyson |
| 4,853,011 | A | * | 8/1989 | Dyson |
| 4,944,780 | A | * | 7/1990 | Usmani |
| 4,960,446 | A | | 10/1990 | Werner et al. |
| 4,967,443 | A | | 11/1990 | Krasznai et al. |
| 5,018,240 | A | | 5/1991 | Holman |
| 5,020,186 | A | | 6/1991 | Lessig, III et al. |
| 5,062,870 | A | * | 11/1991 | Dyson |
| 5,078,761 | A | * | 1/1992 | Dyson |
| 5,080,697 | A | | 1/1992 | Finke |
| 5,090,975 | A | * | 2/1992 | Requejo et al. |
| 5,090,976 | A | * | 2/1992 | Dyson |
| 5,101,532 | A | * | 4/1992 | Dyson |
| 5,106,488 | A | | 4/1992 | Jonasson |
| 5,107,567 | A | | 4/1992 | Ferrari et al. |
| 5,129,125 | A | | 7/1992 | Gamou et al. |
| 5,145,499 | A | * | 9/1992 | Dyson |
| 5,160,356 | A | * | 11/1992 | Dyson |
| 5,230,722 | A | * | 7/1993 | Yonkers |
| 5,248,323 | A | * | 9/1993 | Stevenson |
| 5,254,147 | A | | 10/1993 | Finke |
| 5,267,371 | A | * | 12/1993 | Soler et al. |
| 5,271,751 | A | * | 12/1993 | Lagler et al. |
| 5,287,591 | A | * | 2/1994 | Rench et al. |
| 5,307,538 | A | * | 5/1994 | Rench et al. |
| 5,427,597 | A | * | 6/1995 | Osendorf |
| 5,464,460 | A | * | 11/1995 | Bosses |
| 5,558,697 | A | | 9/1996 | Dyson et al. |
| 5,593,479 | A | * | 1/1997 | Frey et al. |
| 5,603,741 | A | * | 2/1997 | Frey |
| 5,659,922 | A | | 8/1997 | Louis |
| 5,685,894 | A | * | 11/1997 | Bowerman |
| 5,704,956 | A | * | 1/1998 | Loveless et al. |
| 5,725,623 | A | | 3/1998 | Bowerman et al. |
| 5,746,795 | A | | 5/1998 | Witter |
| 5,779,745 | A | * | 7/1998 | Kilstrom |
| 5,829,090 | A | | 11/1998 | Melito et al. |
| 5,867,863 | A | | 2/1999 | McCormick |
| 5,922,093 | A | | 7/1999 | James et al. |
| 5,935,279 | A | | 8/1999 | Kilström |
| 5,946,771 | A | | 9/1999 | Bosyj et al. |
| 5,961,677 | A | | 10/1999 | Scott |
| 6,003,196 | A | | 12/1999 | Wright et al. |
| 6,012,200 | A | | 1/2000 | Murphy et al. |
| 6,070,291 | A | | 6/2000 | Bair et al. |
| 6,146,434 | A | | 11/2000 | Scalfani et al. |
| 6,192,550 | B1 | | 2/2001 | Hamada et al. |
| 6,256,834 | B1 | | 7/2001 | Meijer et al. |
| 6,260,234 | B1 | | 7/2001 | Wright et al. |

* cited by examiner

UPRIGHT VACUUM CLEANER WITH CYCLONIC AIRFLOW

Matter enclosed in heavy brackets [ ] appears in the original patent but forms no part of this reissue specification; matter printed in italics indicates the additions made by reissue.

This is a continuation-in-part of application Ser. No. 09/044,999, filed Jan. 9, 1998.

BACKGROUND OF THE INVENTION

The present invention relates to vacuum cleaners. More particularly, the present invention relates to upright version cleaners used for suctioning dirt and debris from carpets and floors.

Upright vacuum cleaners are ubiquitous. They are known to include an upper portion having a handle, by which an operator of the vacuum cleaner may grasp and maneuver the cleaner, and a lower cleaning nozzle portion which travels across a floor, carpet, or other surface being cleaned. The upper portion is often formed as a rigid plastic housing which encloses a dirt and dust collecting filter bag, although the upper portion may simply be an elongated handle with the filter bag, and an external cloth bag, being hung therefrom. The cleaning nozzle is hingedly connected to the upper handle portion such that the upper portion is pivotable between a generally vertical upright storage position and an inclined operative position. The underside of the nozzle includes a suction opening formed therein which is in fluid communication with the filter bag.

A vacuum or suction source such as a motor and fan assembly is enclosed either within the nozzle portion or the upper portion of the cleaner. The vacuum source generates the suction required to pull dirt from the carpet or floor being vacuumed through the suction opening and into the filter bag. A rotating brush assembly is typically provided in proximity with the suction opening to loosen dirt and debris from the surface being vacuumed.

To avoid the need for vacuum filter bags, and the associated expense and inconvenience of replacing the bag, another type of upright vacuum cleaner utilizes cyclonic airflow, rather than a filter bag, to separate a majority of the dirt and other particulates from the suction airstream. The air is then filtered to remove residual particulates, returned to the motor, and exhausted.

Such prior cyclonic airflow upright vacuum cleaners have not been found to be entirely effective and convenient to use. For example, with these prior cyclonic airflow vacuum cleaners, the process of emptying dust and dirt from the cyclonic chamber dirt collection container has been found to be inconvenient, and often resulted in the spillage of the cup contents. Likewise, with these prior units, replacement of the filter element has not been convenience. Other cyclonic airflow vacuum cleaners have been found to exhaust air which is not free of residual contaminants. For example, one prior unit filters the airstream after it passes through the cyclonic chamber, but thereafter passes the airstream through the motor assembly where it is potentially recontaminated by the motor assembly, itself, prior to its being exhausted into the atmosphere.

Because the cyclonic action of such vacuum cleaners does not completely remove all dust, dirt, and other contaminants from the suction airstream, it is necessary to include a filter downstream from the cyclonic chamber. As such, prior cyclonic airflow vacuum cleaners have heretofore included conventional filter elements including conventional media to filter the airstream after it passes through the cyclonic chamber. These prior filter elements have caused considerable difficulties. A conventional filter that is sufficiently fine to filter the airstream effectively unduly restricts airflow and decreases the effectiveness of the cyclonic action. On the other hand, a coarse filter does not effectively filter the airstream of residual contaminants. Further, conventional filter media, such as paper or fibrous media, has been found to clog readily, thereby unduly decreasing airflow rates over time. Thus, a need has been found for a cyclonic airflow vacuum cleaner with an effective filter positioned downstream relative to the cyclonic chamber for effectively filtering the airstream without clogging.

Accordingly, it has been deemed desirable to develop a new and improved upright vacuum cleaner which would overcome the foregoing difficulties and others while providing better and more advantageous overall results.

SUMMARY OF THE INVENTION

According to the present invention, a new and improved upright vacuum cleaner is provided.

In accordance with a first aspect of the invention, a vacuum cleaner includes a housing defining a cyclonic airflow chamber for separating contaminants from a suction airstream. The housing includes a floor, a top wall, a suction airstream inlet, and a suction airstream outlet. The suction airstream inlet and outlet are both in fluid communication with the cyclonic airflow chamber. A suction opening is defined on the housing. The suction opening is fluidically connected with the cyclonic airflow chamber inlet. An airstream suction source is located on the housing. The suction source has an inlet fluidically connected to said cyclonic airflow chamber outlet and a suction source exhaust outlet. The suction source selectively establishes and maintains a suction airstream from the section opening to the suction source exhaust outlet. A main filter support extends upwardly from the floor of the housing for releasably securing a main filter element centrally in the cyclonic airflow chamber, and a main filter element is secured thereto. A dirt cup is selectively positioned in the housing. The main filter element is positioned in the dirt cup.

In accordance with another aspect of the invention, an upright vacuum cleaner is provided.

The vacuum cleaner includes an upright housing section including a handle. A nozzle base section is hingedly interconnected with the upright housing section and includes a main suction opening formed in an underside thereof. A cyclonic airflow chamber is defined in the upright housing section and separates dust and dirt from a suction airstream. A suction source is located in one of the upright section and the nozzle base section and has a suction airflow inlet in fluid communication with the cyclonic chamber and a suction airflow outlet. A main filter element is located in the cyclonic residual dust and dirt from a suction airstream passing through the cyclonic airflow chamber. The main filter element extends upwardly within the cyclonic airflow chamber from a floor of said housing section. The lower portion of the cyclonic airflow chamber is defined by a dirt container for receiving and retaining dirt and dust separated from the suction airstream.

In accordance with a further aspect of the invention, a vacuum cleaner is provided.

The vacuum cleaner includes a nozzle section A housing section is connected to the nozzle section and is in fluid communication with the nozzle section. A cyclonic airflow chamber is located in the housing section for separating dirt and dust from a suction airstream flowing into the housing section between an inlet located at a periphery of the housing section and an outlet located along a longitudinal centerline of the housing section. An upper conduit depends from a top wall of the cyclonic airflow chamber and includes a passage therein in communication with the cyclonic airflow chamber outlet. A main filter element extends upwardly from a floor of the cyclonic airflow chamber in a central portion of the chamber so that an annulus is defined between the main filter element and the housing. The main filter element filter is sealingly engaged with the outlet passage in the upper conduit and is adapted for filtering residual dust and dirt from the suction airstream prior to the suction airstream exiting the cyclonic airflow chamber.

One advantage of the present invention is the provision of a new and improved vacuum cleaner.

Another advantage of the invention is found in the proversion of a vacuum cleaner with a cyclonic airflow chamber through which the suction airflows for separating dust and dirt from the airstream and for depositing the separated dust and dirt into an easily and conveniently emptied dirt cup.

Still another advantage of the present invention resides in the provision of a cyclonic airflow upright vacuum cleaner with a main filter that effectively filters residual contaminants from the suction airstream between the cyclonic airflow chamber and the motor assembly without unduly restricting airflow and without premature clogging.

Yet another advantage of the invention is the provision of a cyclonic airflow upright vacuum cleaner with a final filter located downstream from the suction motor assembly for filtering the suction airstream immediately prior to its exhaustion into the atmosphere.

A further advantage of the invention is the provision of a vacuum cleaner with a main filter, an auxiliary filter, and a final filter wherein the main, auxiliary, final filters are easily removable and replaceable.

A still further advantage of the present invention is the provision of a vacuum cleaner with a filter element mounted in a filter housing wherein the filter element and filter housing cooperate to provide a tortuous flow path for air flowing therethrough.

A yet further advantage of the present invention is the provision of a vacuum cleaner with a cyclonic airflow chamber wherein accumulated dust and dirt in the chamber act to further filter at least a portion of the suction airstream passing through the chamber.

An additional advantage of the present invention is the provision of a vacuum cleaner with a cyclonic airflow chamber and main filter element, wherein the main filter element is positioned in a removable dirt cup partially defining the cyclonic airflow chamber for ease of emptying the dirt cup and cleaning the filter.

Still other benefits and advantages of the invention will become apparent to those skilled in the art upon reading and understanding the following detailed description.

BRIEF DESCRIPTION OF THE DRAWINGS

The invention may take form in certain components and structures, preferred embodiments of which will be illustrated in the accompanying drawings wherein.

DETAILED DESCRIPTION OF THE PREFERRED EMBODIMENTS

Referring now to the FIGURES, wherein the showings are for purposes of illustrating preferred embodiments of the invention only and not for purposes of limiting the same, FIGS. 1–6 illustrate and upright vacuum cleaner A including an upright housing section B and a nozzle base section C. The sections B,C are pivotally or hingedly connected through the use of trunnions or another suitable hinge assembly D so that the upright housing section B pivots between a generally vertical storage position (as shown) and an inclined operative position. Both the upright and nozzle sections B,C are preferably made from conventional materials such as molded plastics and the like. The upright section B includes a handle 20 extending upward therefrom by which an operator of the vacuum A is able to grasp and maneuver the vacuum.

Figure 1:
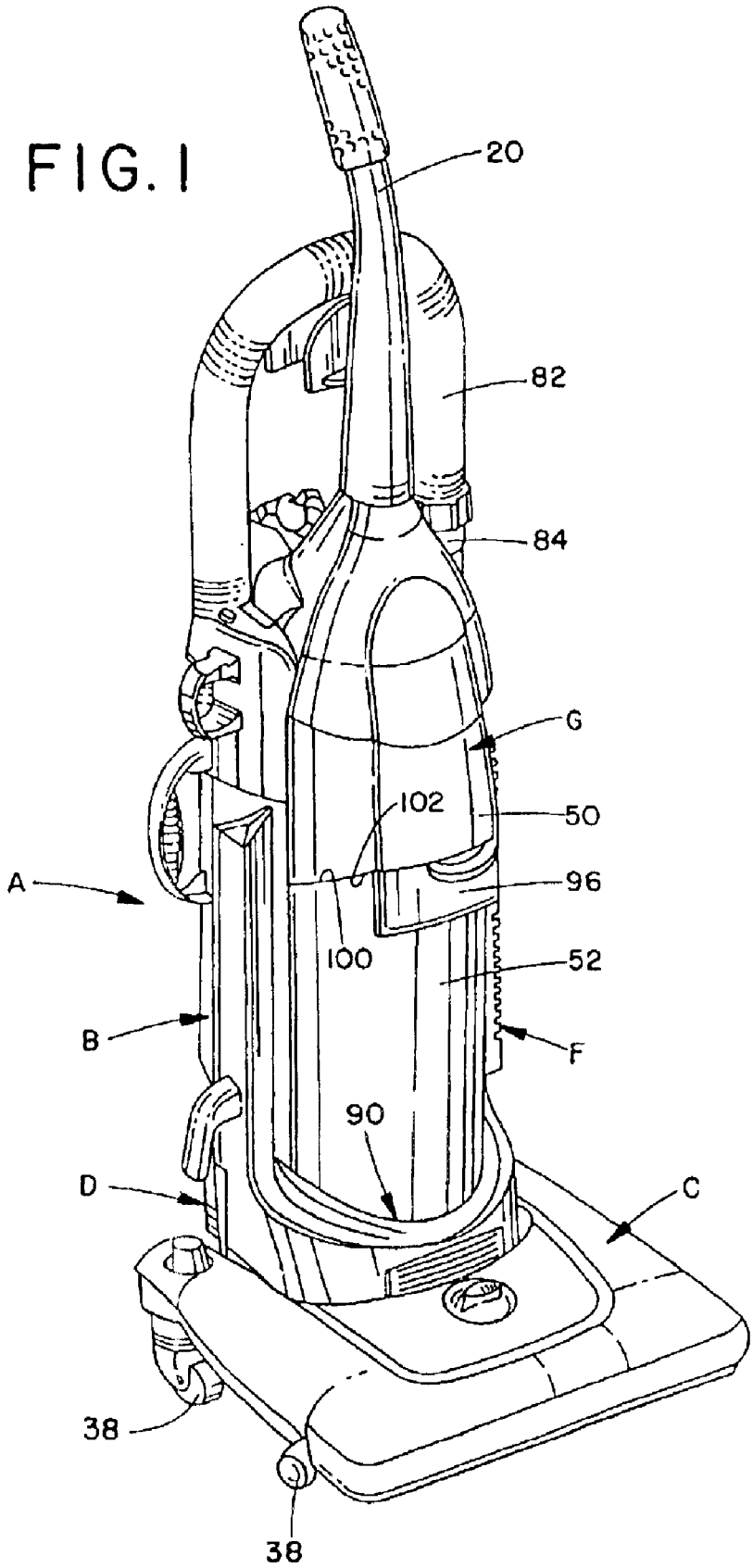
FIG. 1 is a perspective view illustrating a cyclonic airflow upright vacuum cleaner in accordance with the present invention.
Figure 2:
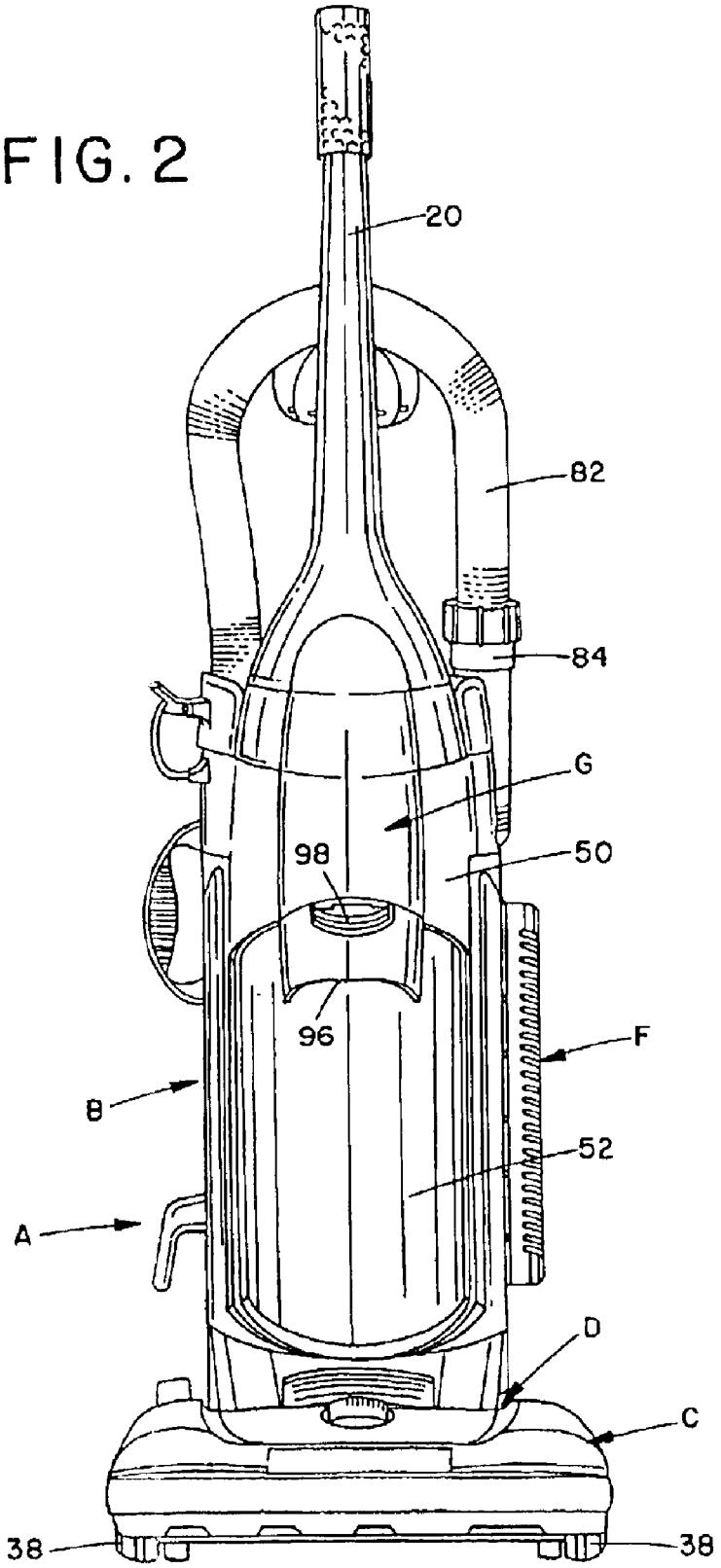
FIG. 2 is a front elevational view of the vacuum cleaner illustrated in FIG. 1.
Figure 3:
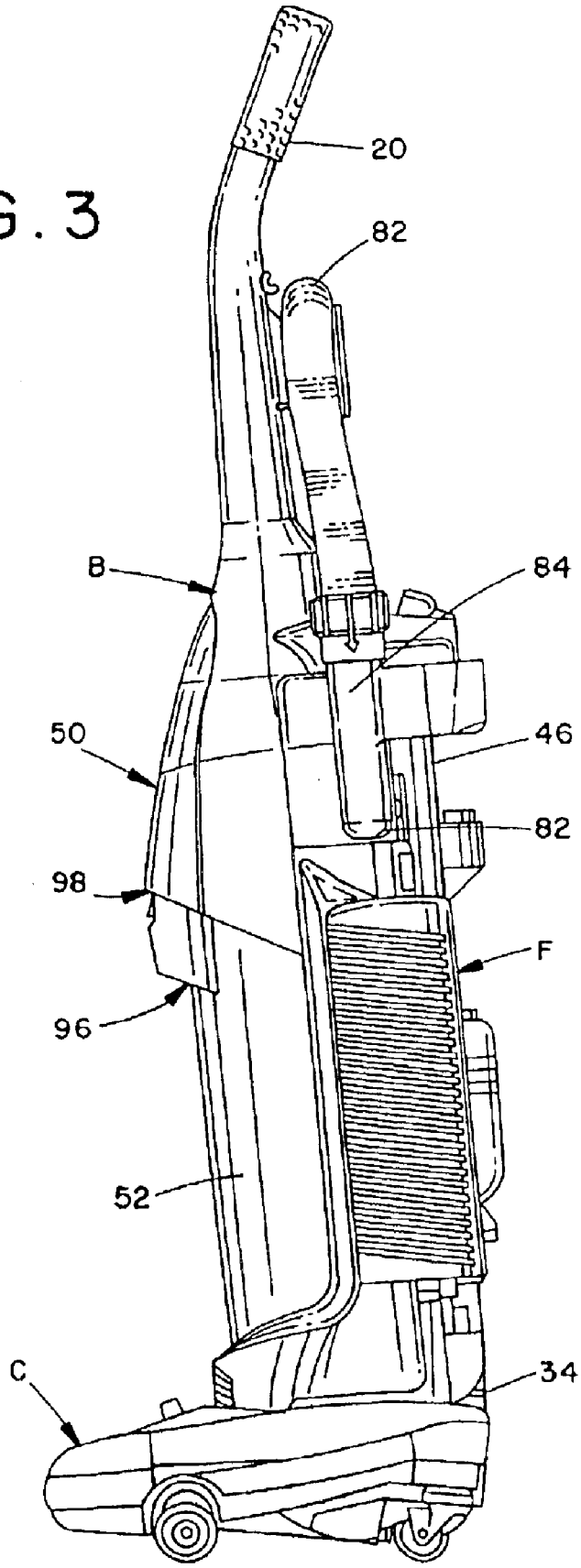
FIGS. 3 and 4 are left and right side elevational views, respectively, of the vacuum cleaner shown in FIG. 1.
Figure 4:
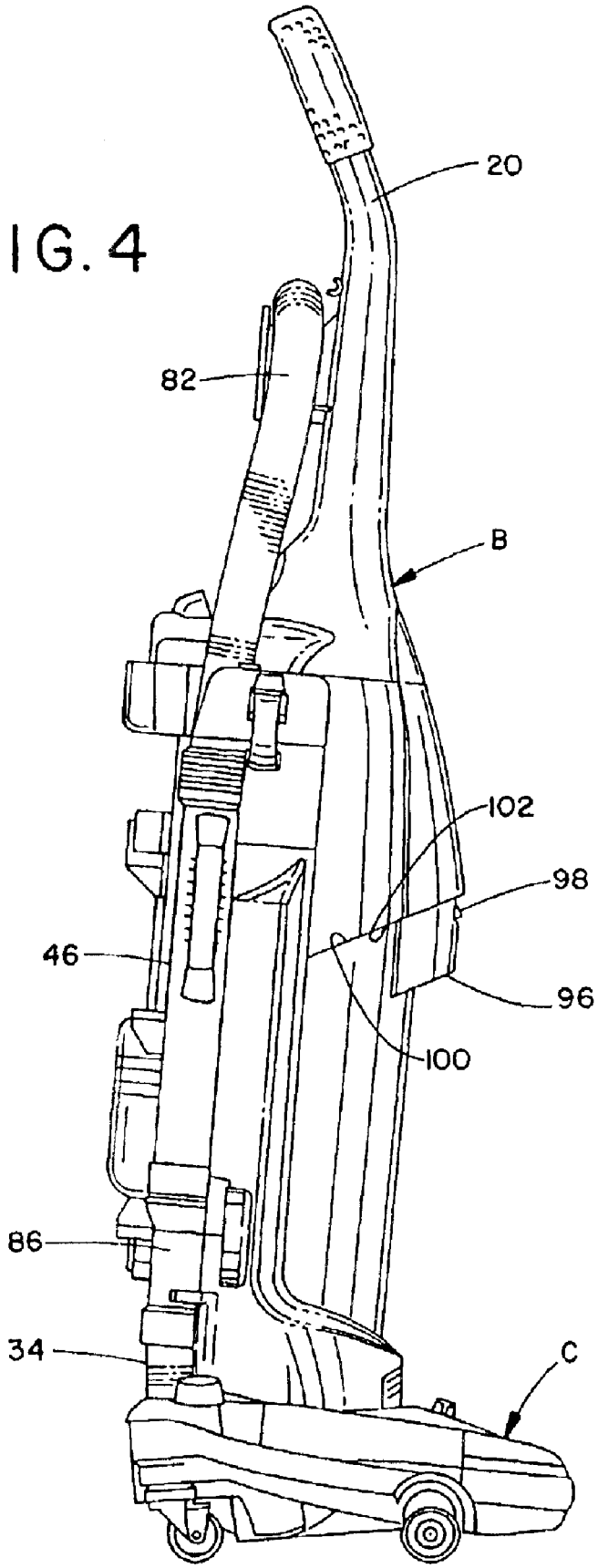
Figure 5:
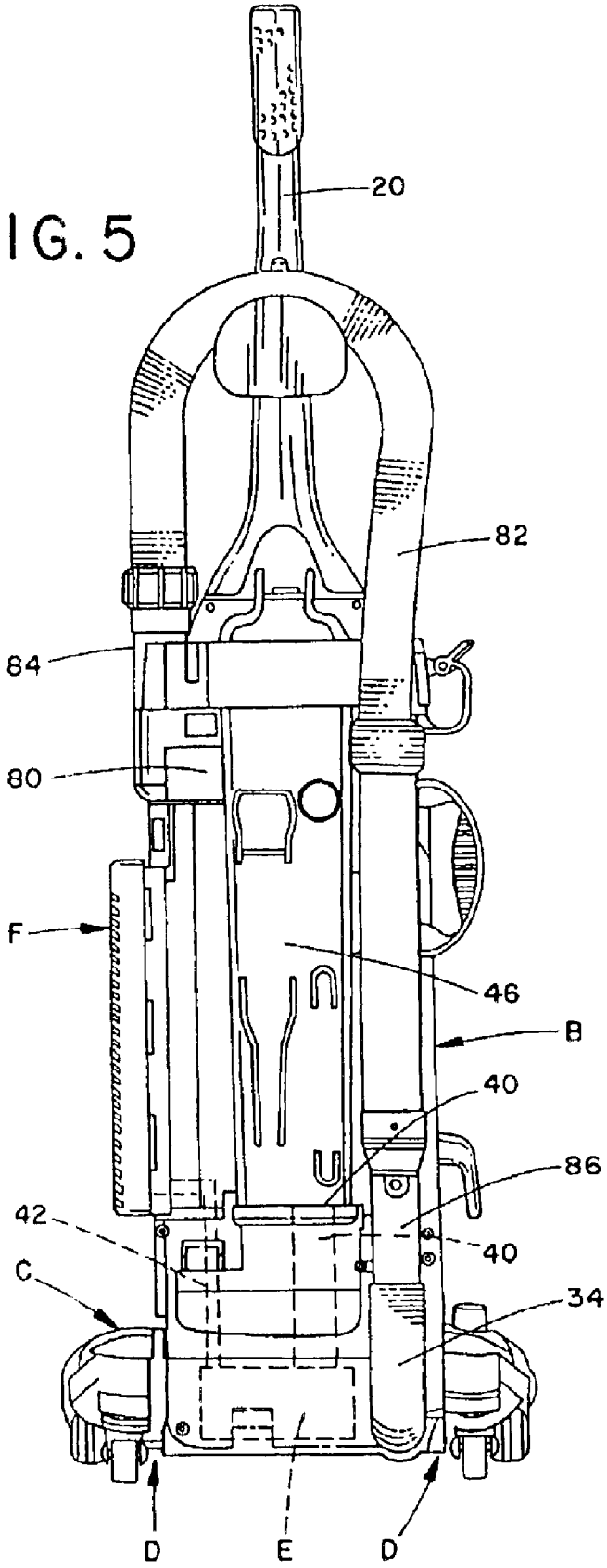
FIG. 5 is a rear elevational view of the vacuum cleaner of FIG. 1, further showing the required suction hose assemblies in broken lines for clarity.
Figure 6:
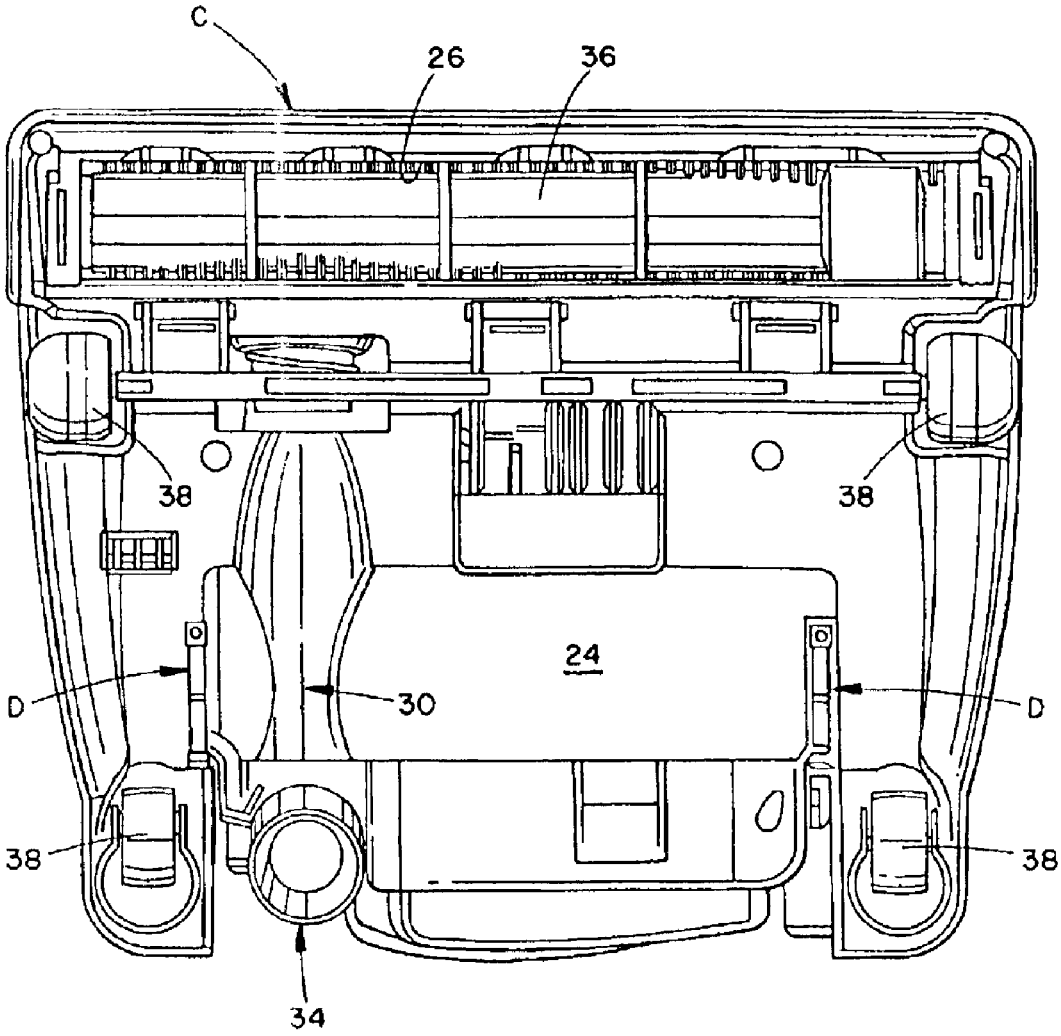
FIG. 6 is a bottom plan view of the vacuum cleaner of FIG. 1.

During vacuuming operations, the nozzle base C travels across the floor, carpet, or other subjacent surface being cleaned. The underside 24 (FIG. 6) of the nozzle includes a main suction opening 26 formed therein which extends substantially across the width of the nozzle at the front end thereof. The main section opening 26 is in fluid communication with the vacuum upright body section B through a passage 30 and a connector hose assembly 34 (FIG. 5). A rotating brush assembly 36 is positioned in the region of the nozzle main suction opening 26 for contacting and scrubbing the surface being vacuumed to loosen embedded dirt and dust. A plurality of wheels 38 support the nozzle on the surface being cleaned and facilitate its movement thereacross.

Figure 9:
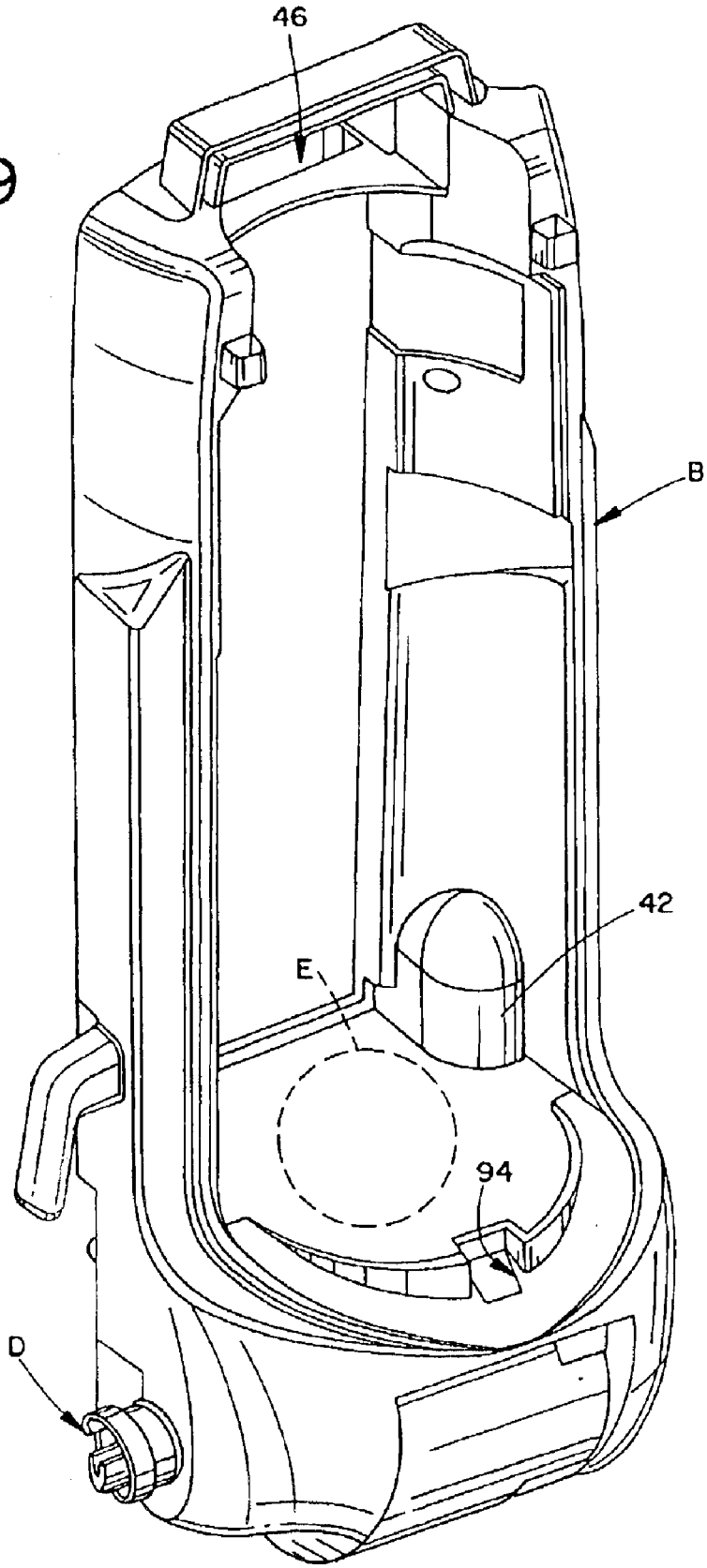
FIG. 9 is a perspective view of the upright body portion shown in FIG. 7, with the dirt cup and main filter housing removed for clarity.

The upright vacuum cleaner A includes a vacuum or suction source for generating the required suction airflow for cleaning operations. With reference particularly to FIGS. 5 and 9, a suitable suction source, such as an electric motor and fan assembly E, generates a suction force in a suction inlet 40 and an exhaust force in an exhaust outlet 42. The motor assembly airflow exhaust outlet 42 is in fluid communication with a downstream final filter assembly F for filtering the exhaust airstream of any contaminants immediately prior to its discharge into the atmosphere. The motor assembly suction inlet 40, on the other hand, is in fluid communication with an upstream elongated suction conduit 46 which extends upward from the motor/fan assembly E to an upper region of the upright section B where it communicates with the cyclonic suction airflow dust and dirt generating region G of the vacuum A to generate a suction force therein.

Figure 7:
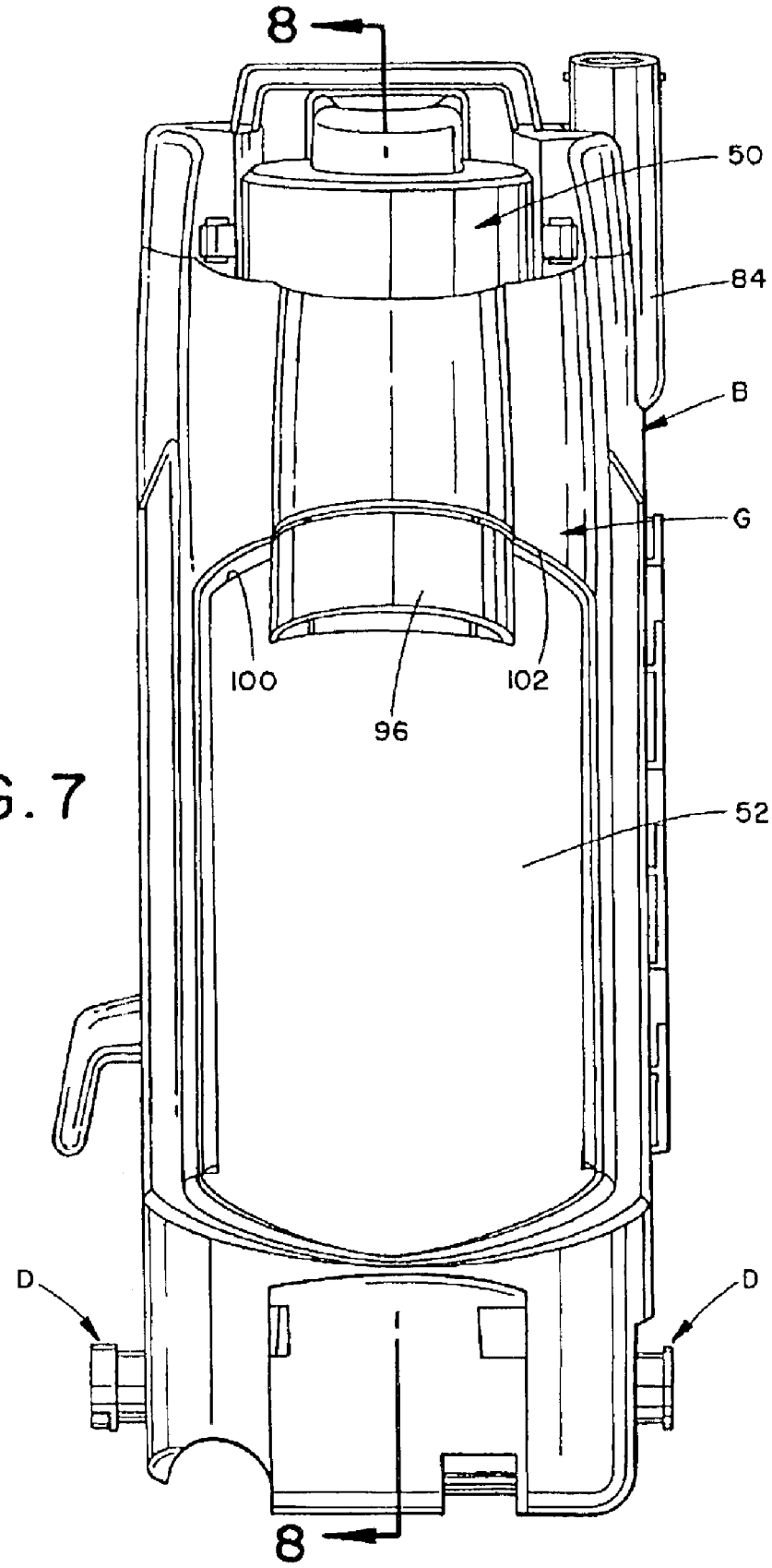
FIG. 7 is a front elevational view of the upright body portion of the vacuum cleaner of FIG. 1.
Figure 8:
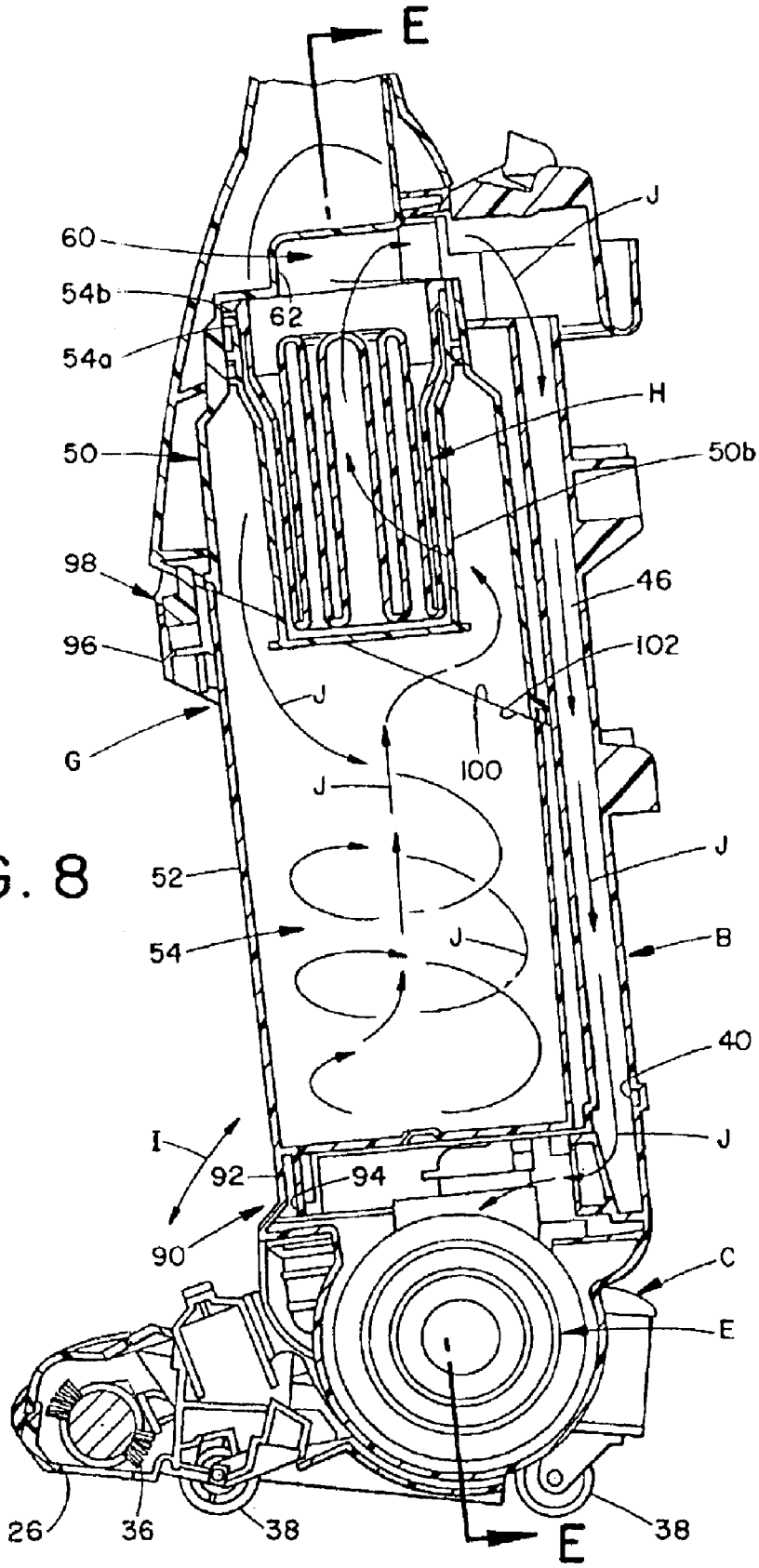
FIG. 8 is a partial side view in cross-section of the vacuum cleaner illustrated in FIG. 1, and further diagrammatically illustrating the suction airstream flow.

With reference particularly to FIGS. 7 and 8, the cyclonic suction airflow dust and dirt separating region G housed in the upright section B includes a main filter housing assembly 50 and a mating dust and dirt cup or container 52. The sections 50,52 together define a generally cylindrical cyclonic airflow chamber 54.

Figure 10:
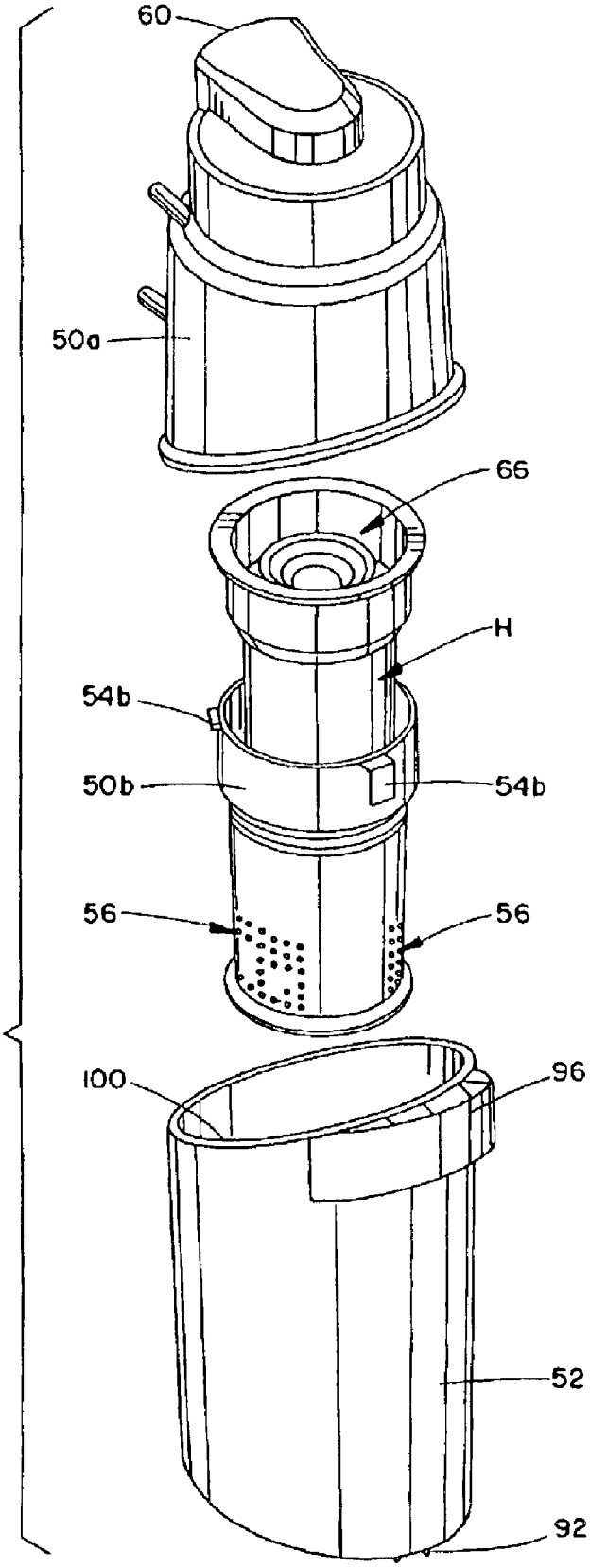
FIG. 10 is an exploded perspective view of the main filter, main filter housing, and dirt cup.

It may be seen with reference also to FIG. 10 that the main filter housing assembly 50 is, itself, constructed from two mating sections—an upper fixed housing section 50a, and a lower, detachable filter housing section 50b. The lower detachable filter housing section 50b receives and retains a main filter element or cartridge H. The filter housing section 50b releasably connects with the upper housing section 50a to secure the filter element H in an operative filtering position. More particularly, the section 50b includes a plurality of tabs or tangs 54b extending therefrom. Likewise, with reference also to FIG. 12B, it is shown that the upper housing section 50a includes mating tabs or tangs 54a. Thus, those skilled in the art will recognize that the components 50a,50b connect in a key-like fashion upon rotation of the filter housing section 50b in relation to the upper housing section 50a so that a filter element H is operatively secured in position. Of course, rather than the mating tabs 54a,54b, the two housing sections 50a,50b may alternatively include mating threads, clips, or other suitable cooperating fastening means. The filter housing section 50b includes a plurality of apertures, slots, or other passages 56 formed therethrough, preferably in the lower half thereof, so that the suction airstream flows freely from the chamber 54 into the filter housing section 50b and to the main filter element II.

The housing upper section 50a includes a suction airflow outlet passage 60 (FIG. 8) which communicates with the cyclonic chamber 54 through an aperture 62. The outlet passage 60 also communicates with the elongated suction conduit 46 leading to the motor/fan assembly E when the main filter housing assembly 50 is operatively connected to the vacuum upright section H. FIGS. 8 and 9 show that the elongated suction conduit 46 extends from the motor/fan assembly E upward to communicate with the main filter housing suction outlet passage 60 so that the suction inlet of the motor/fan assembly E is able to fluidically communicate with the cyclonic chamber 54. When the main filter housing assembly 50 is assembled and in the operative position as described, a mouth 66 (FIG. 10) of the filter element H mates with the periphery of the aperture 62 in a fluid-tight relationship. As such, the suction airflow from the cyclonic chamber 54 to the motor/fan assembly suction inlet 42 is not able to bypass the main filter element H, but instead must pass therethrough and be filtered of residual contaminants. It is preferable that the aperture 62, and thus the main filter element H be centrally in the cyclonic chamber 54 to facilitate the cyclonic airflow in the chamber.

Figure 12A:
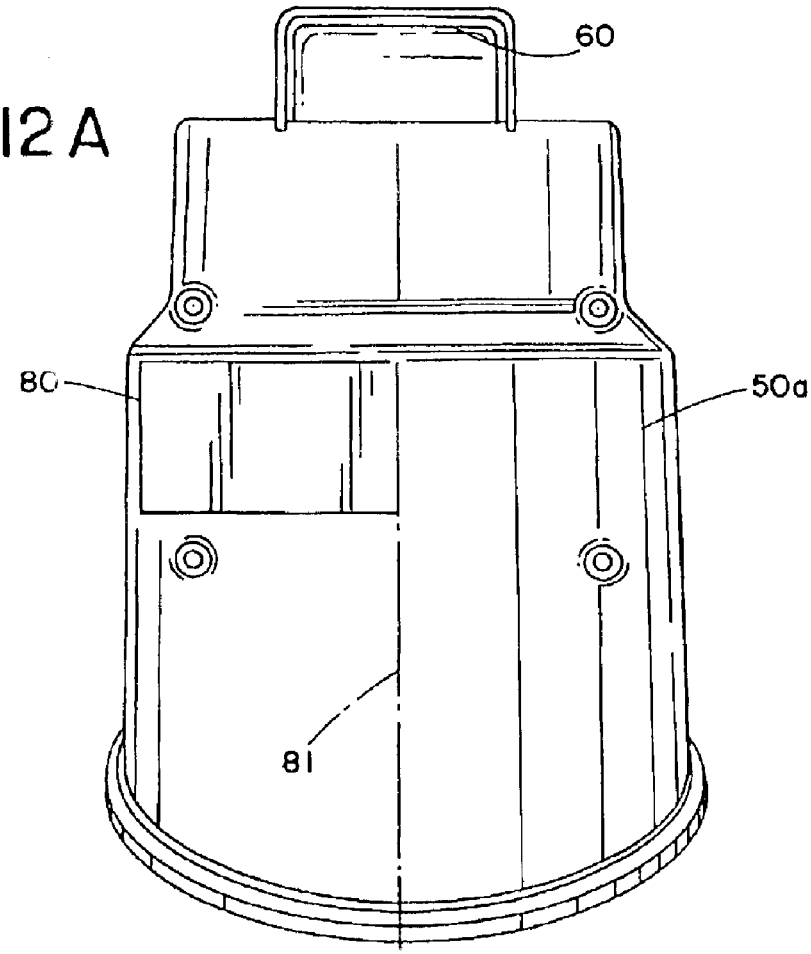
FIGS. 12A and 12B are rear elevational and bottom plan views, respectively, of the upper portion of the main filter housing.
Figure 12B:
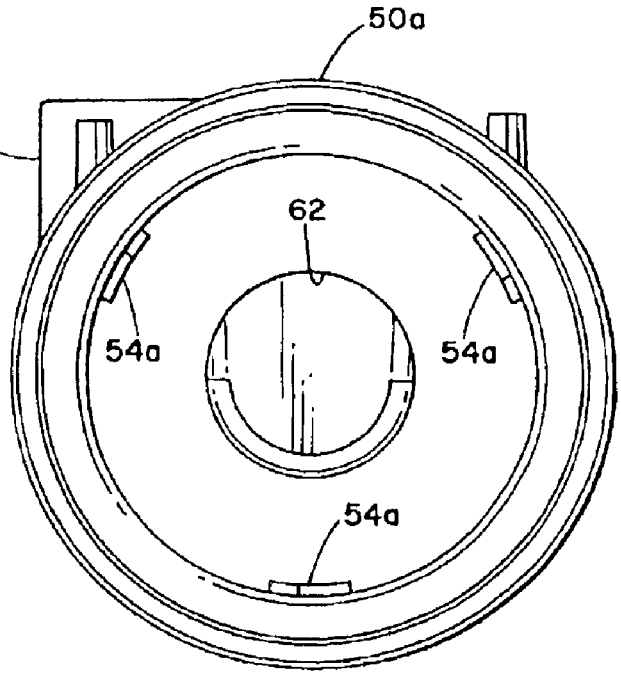

The suction airstream enters an upper portion of the cyclonic dust and dirt separation chamber 54 through a generally tangential suction airstream inlet 80. In the preferred embodiment, as shown in FIGS. 12A–12B, the cyclonic chamber airstream inlet 80 is formed in the upper section 50a of the main filter housing assembly 50. It is noted that the inlet 80 is disposed entirely on one side of a center line 81 of the upper housing section so as to induce a swirling flow around the filter housing section 50b. The suction airstream inlet 80 of the chamber 54 is in fluid communication with a suction airstream hose 82 through a fitting 84. As shown in FIG. 5, the hoses 82,34 are fluidically connected via fitting 86. As such, the main suction opening 26 formed in the nozzle underside 24 is in the fluid communication with the cyclonic chamber 54 through the passage 30, the hoses 34,82, and the cyclonic chamber suction inlet 80.

The dirt cup or container 52 of the cyclonic airflow dust and dirt separating assembly G is constructed for large capacity and ease of emptying the contents as necessary. In FIG. 8, it may be seen that the dirt container 54 defines over ½ the volume of the cyclonic chamber 54. As such, the capacity of the container 52 is a maximized to lengthen the operational time before the dirt container 52 must be emptied. Furthermore, the dirt container 52 is preferably at least partially transparent so that an operator of the vacuum is able to view the level of dirt and dust accumulated therein for purposes of determining when the dirt container should be emptied.

The dirt container 52 is connected to the vacuum upright section B through use of a hinge assembly 90 which allows the dirt container 52 to pivot as indicated by the arrow 1 between an operative upright position and an open forwardly tilted position. As shown herein, the hinge 90 comprises a first component 92 connected to the dirt container 52 and a second mating component 94 formed on the upright section B. Once the dirt container 52 is pivoted to the open position, it may be pulled upward and away from the section B and separated therefrom for ease of emptying the dirt container. Of course, after the dirt container is emptied, the foregoing procedure is reversed so that the dirt container is once again in the operative position. A handle 96 is provided on the exterior of the container 52 to facilitate operator movement of the container between the operative, open, and removed position. A resiliently biased latch 98 retains the dirt container in the operative position. The latch 98 is biased through use of a spring or other resilient member, or via the natural resiliency of the plastic from which it is molded.

With continuing reference to FIG. 8, the dirt container upper edge 100 defining an open upper end of the container 52 is preferably inclined downwardly in the direction away from the handle 96 on front of the container 52. The main filter housing assembly section 50 is formed with a complimentary mating inclined edge 102, and a seal such as a gasket or other structure (not shown) is provided between the edges 100,102 to prevent air leakage into the cyclonic airflow chamber 54. The inclined upper edge 100 of the dirt container 52 also ensures that, when the container is pivoted to the open position, the upper edge 100 lies in a substantially horizontal plane. As such, the contents of the container are much less likely to spill when the container is opened during emptying operations. Preferably, the angle at which the upper edge 100 is inclined from horizontal is selected, in combination with the maximum distance the container is able to be pivoted on the arc 1 when opened, such that when the container is fully opened, the upper edge lies in a substantially horizontal plane.

Figure 13A:
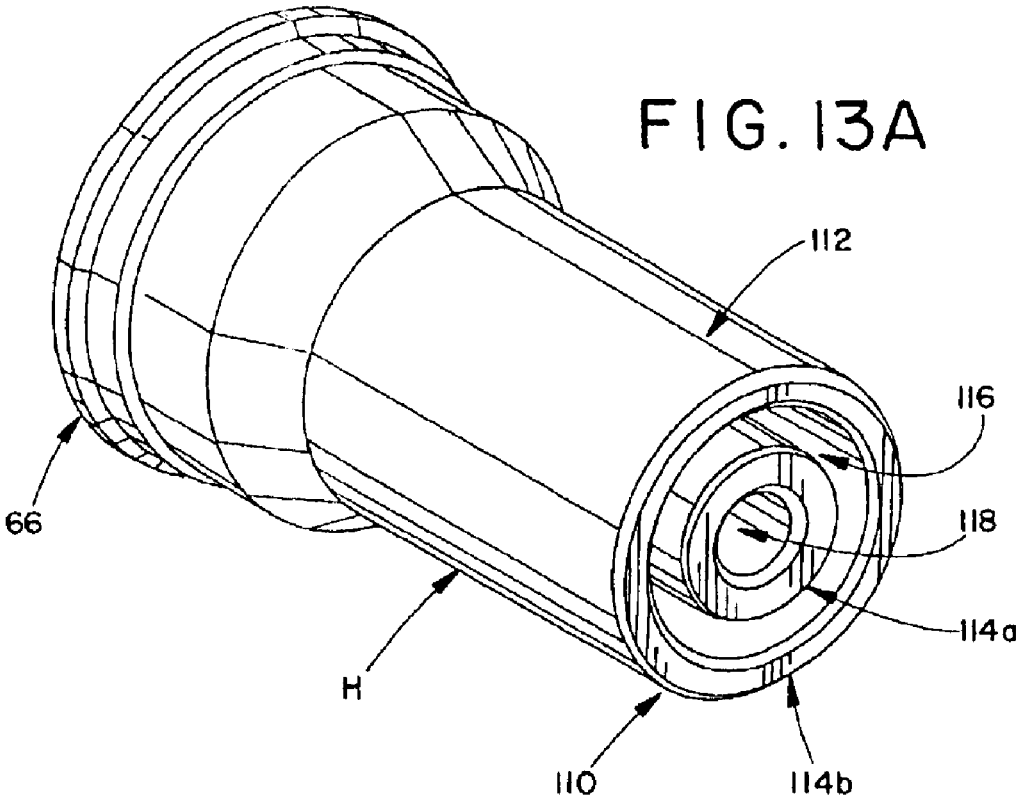
FIG. 13A is a perspective view of a main filter in accordance with the present invention.
Figure 13B:
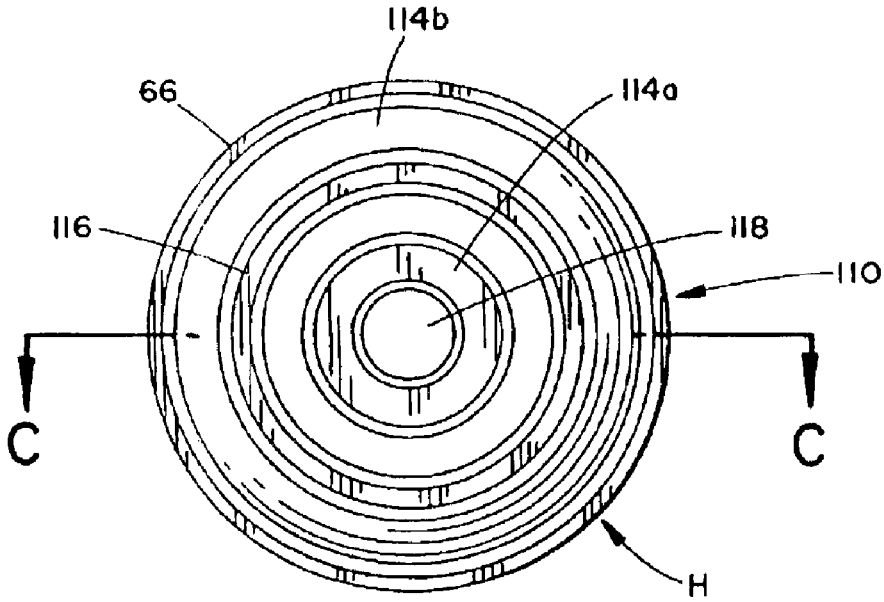
FIG. 13B is a bottom plan view of the main filter.
Figure 13C:
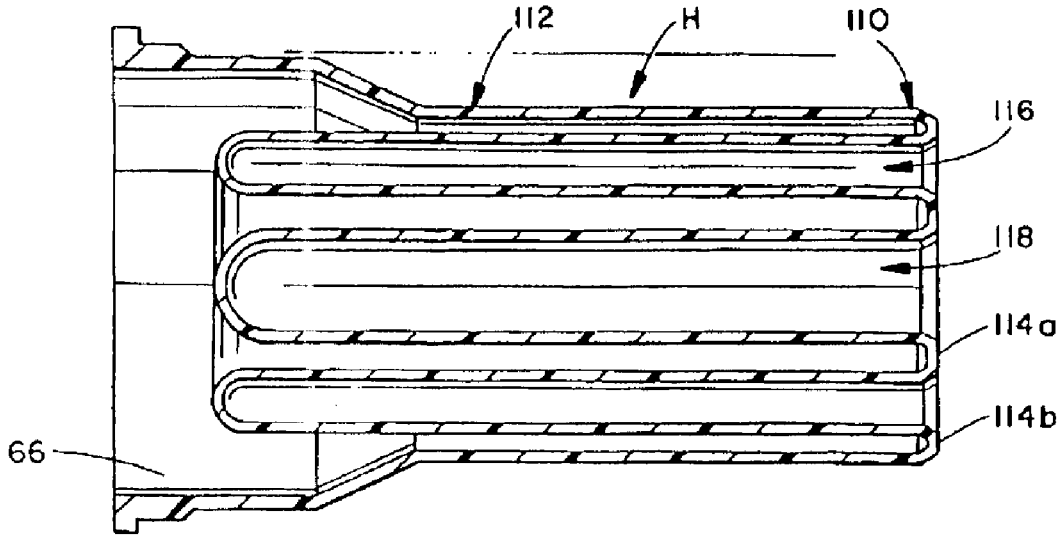
FIG. 13C is a cross-sectional view of the main filter along line C—C of FIG. 13B.

As is shown in FIGS. 13A–13C, the main filter element II is preferably generally frusio-conical in overall configuration, converging in the direction away from the filter mouth 66 toward an opposite filter end 110. However, those skilled in the art will recognize that a cylindrical or other filter configuration may be advantageously employed without departing from the scope and overall intent of the invention.

Figure 13D:
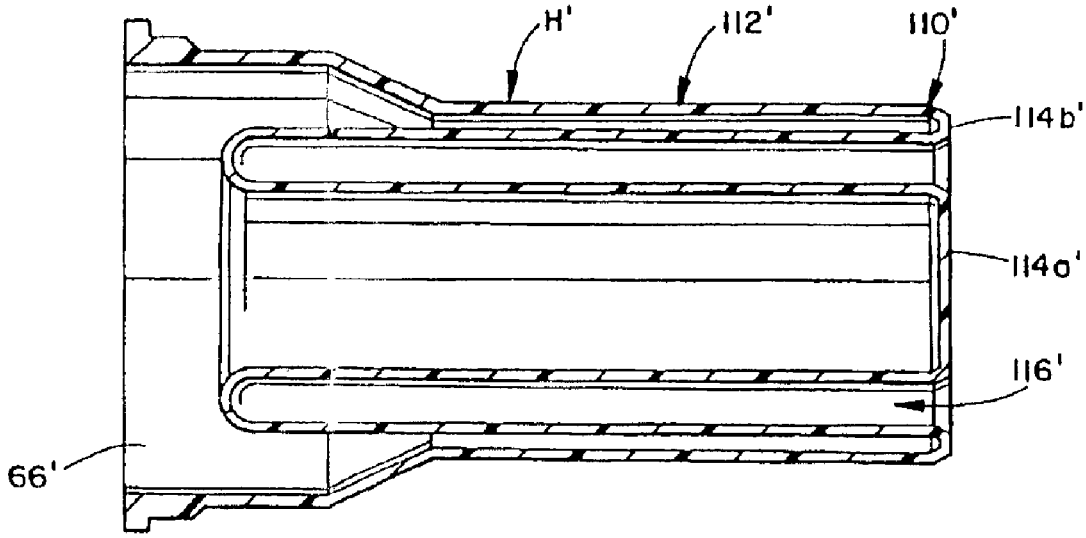
FIG. 13D is a cross-sectional view of an alternative main filter element in accordance with the present invention.

The preferred filter media comprises Porex® brand high density polyethylene-based open-celled porous media available commercially from Porex Technologies Corp., Fairburn, Ga. 30213, or an equivalent foraminous filter media. This preferred filter media is a rigid open-celled foam that is moldable, machinable, and otherwise workable into any shape as deemed advantageous for a particular application. Most preferably, to optimize filtration but also to allow sufficient airflow rates, the preferred filter media has an average pore size in the range of 45 $\mu$m to 90 $\mu$m. As is shown in FIGS. 13A–13C, the filter H is most preferably formed in a convoluted or circuitous configuration to maximize an outer surface area 112 of the filter. The maximized surface area 112 allows for the filter media to have a smaller pore size without unduly restricting the airflow therethrough. Most preferably, the filter media is formed into at least two elongated and concentric cylinders and/or frustums, 114a,114b with a deep annular passage 116 defined therebetween. Preferably, a deep central passage 118 is defined in the innermost cylinder or frustum 114a. However, it should be appreciated that other filter designs could also be used if so desired. For example, it is possible to use a filter element not having a deep central passage. FIG. 13D illustrates such an alternative configuration of the main filter element H'. Like components relative to the main filter element 11 are identified with like numerals including a primed (') suffix. The filter element H' is formed by concentric cylindrical portions 114a',114b' separated by a deep annular passage 116'. However, unlike the main filter element H, the element H' does not include a deep central passage formed in the inner cylindrical 114a'.

Figure 11:
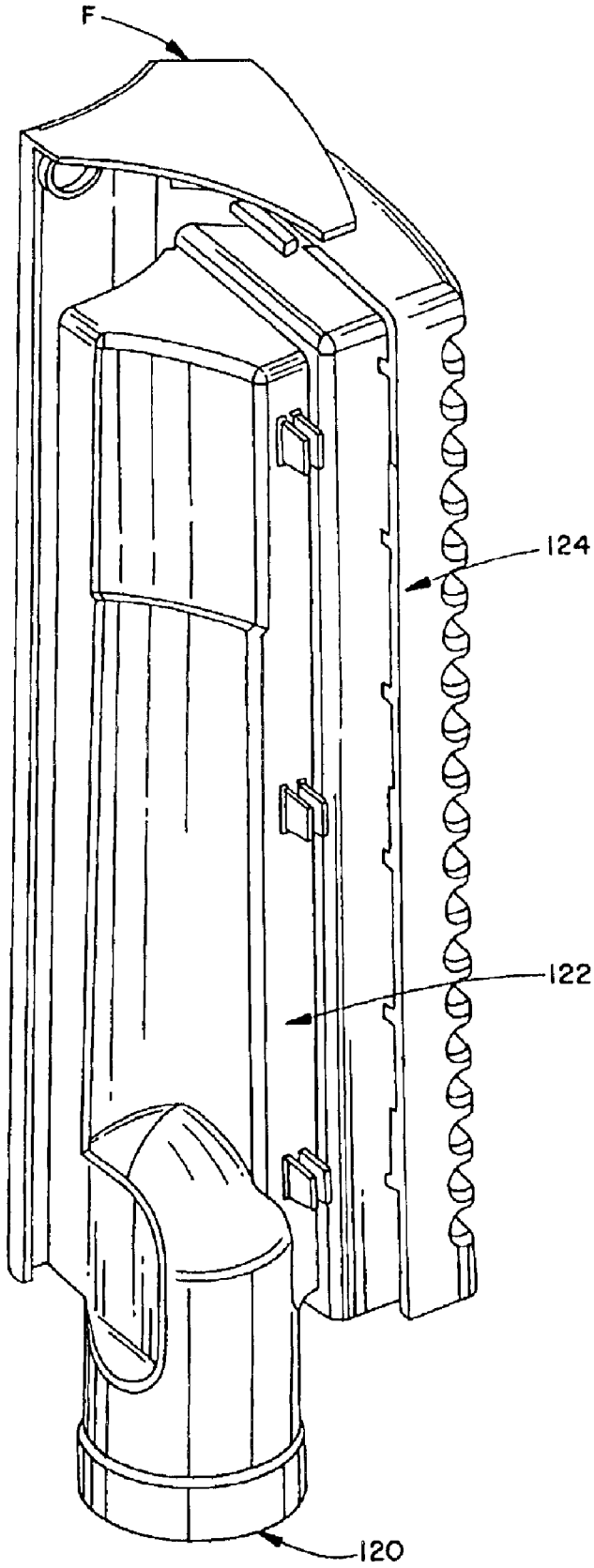
FIG. 11 is a perspective view of the final filter assembly in accordance with the present invention.

As mentioned the subject vacuum A also comprises a final filter assembly F for filtering the suction airstream downstream from the motor/fan assembly and immediately prior to its exhaustion into the atmosphere. The preferred final filter assembly F is illustrated most clearly in FIG. 11 and comprises a suction airstream inlet 120 which is connected downstream and in fluid communication with the exhaust outlet 42 of the motor and fan assembly E. The inlet 120 is itself in fluid communication with an elongated plenum 122 that opens to the atmosphere and houses filter media A protective grid or grate structure in snap-fit or otherwise effectively secured over the plenum 122 to secure the filter media in place. The filter media is preferably a high efficiency particulate arrest (HEPA) filter element in a sheet or block form. The filter media is retained in position in the plenum by the grid 124, but is easily replaced by removing the grid. As such, those skilled in the art will recognize that even if the motor/fan assembly causes contaminants to be introduced into the suction airstream downstream from the main filter element H, the final filter assembly F will remove the same such that only contaminant-free air is discharged into the atmosphere.

Figure 14:
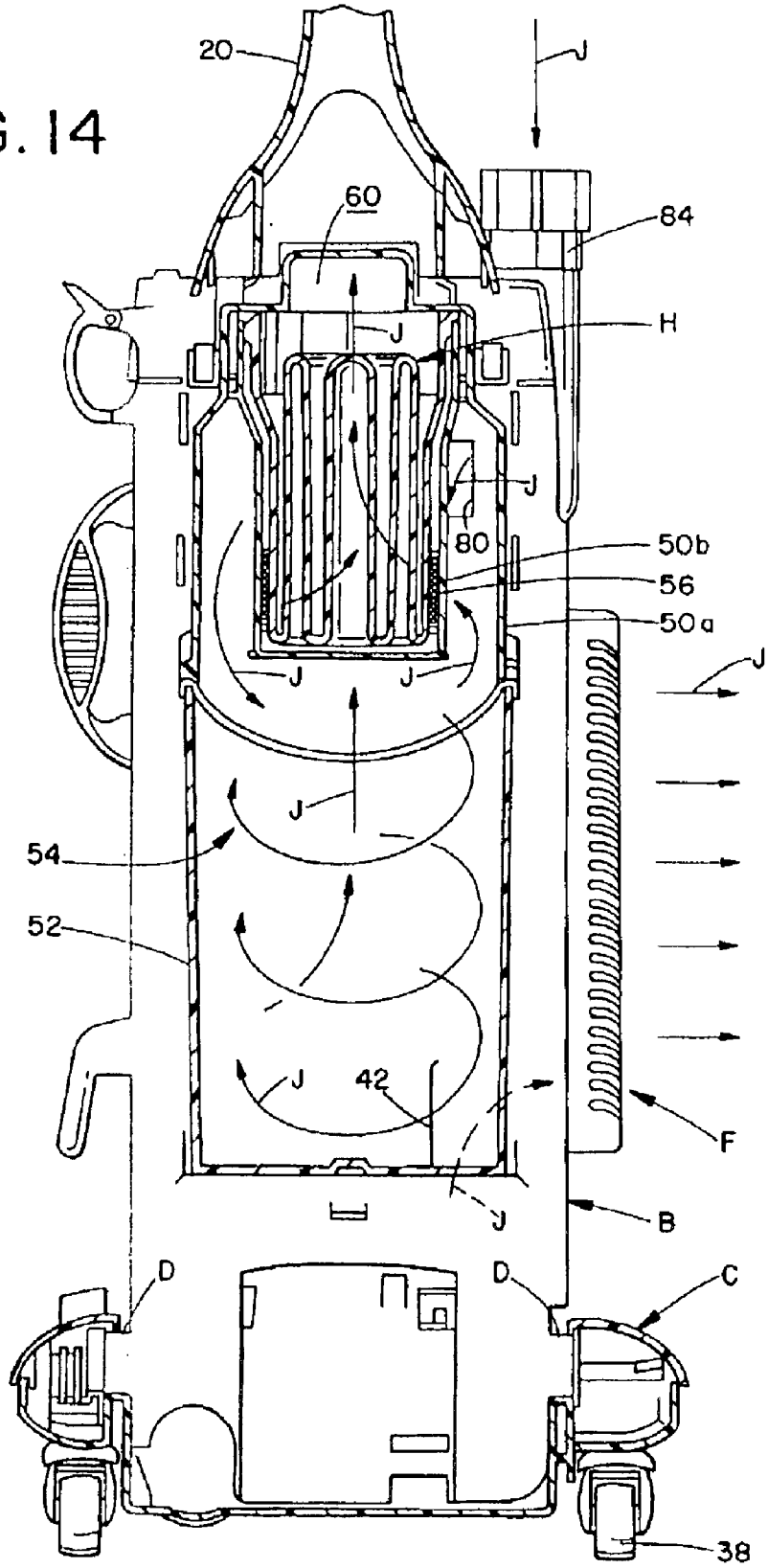
FIG. 14 is a front elevational view, partially in cross-section along line E—E of FIG. 8, illustrating the upright body portion of the vacuum cleaner of FIG. 1.

Referring primarily to FIGS. 8 and 14, the operation of the vacuum cleaning apparatus A is illustrated, with the flow of the suction airstream indicated by use of arrows J. The motor/fan assembly E or other suction generator establishes a suction force at its suction inlet 42, in the elongated suction conduit 46, and thus in the cyclonic separation chamber 54. This suction force or negative pressure in the chamber 54 is communicated to the main suction opening 26 formed in the nozzle underside 24 through the hoses 82,34 (FIG. 5) and associated fittings. This, then, in combination with the scrubbing action of the rotating brush assembly 36 causes dust and dirt from the surface being cleaned to be entrained in the suction airflow J and pulled into the upper portion of the chamber 54 through the generally tangential inlet 80.

The location of the inlet 80, the outlet passage 60, and the generally cylindrical configuration of the chamber 54 causes the suction airstream to follow a swirling or cyclonic path downward within the chamber 54 and then to move upward through a central portion of the chamber 54 toward the centrally located main filter housing section 50b. The orientation of the inlet 80 will affect the direction of cyclonic airflow, and the invention is not meant to be limited to a particular direction, i.e., clockwise or counterclockwise. Those skilled in the art will certainly recognize that the term "cyclonic" as used herein is not meant to be limited to a particular direction of airflow rotation. This cyclonic action separates a substantial portion of the entrained dust and dirt from the suction airstream and causes the dust and dirt to be deposited in the dirt cup or container 52. The suction airstream then passes through the apertures 56 formed in the main filter housing section 50b, passes through the main filter element H so that residual contaminants are removed, and exits the cyclonic chamber 54 through the suction airstream outlet passage 60 formed in the main filter housing section 50a. The suction airstream is communicated to the motor/fan assembly E and exhausted through the outlet 42 (as indicated by broken arrows) to the final filter assembly F where it is filtered again by the HEPA filter to remove any contaminants that passed through the chamber 54 and the filter II, and any contaminants in the airstream due to its passage through the motor/fan assembly E.

The main filter element H can be cleaned by washing it, either manually or in a dishwasher—since it is dishwasher-safe—to remove dust or dirt particles adhering to the filter element. It is, however, important that the filter H be dried before it is used again. The final filter media of the filter assembly F, however, can not be cleaned and must be replaced when it becomes clogged.

Figure 15:
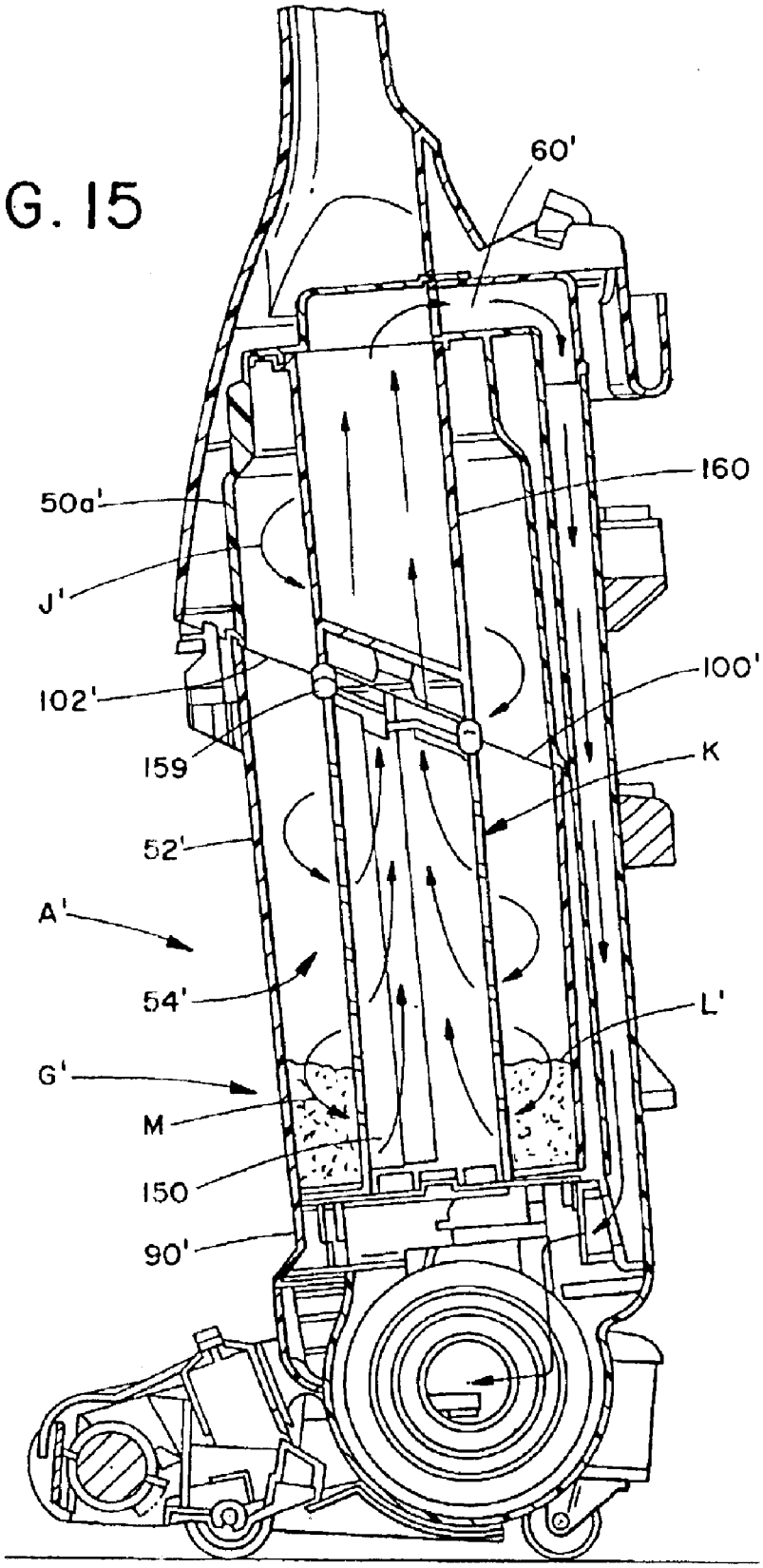
FIG. 15 is a side elevational view in cross-section of a vacuum cleaner with cyclonic airflow in accordance with a second preferred embodiment of the present invention showing airflow through the cyclonic airflow dust and dirt separating chamber.

FIG. 15 illustrates a cyclonic airflow vacuum cleaner A' in accordance with a second preferred embodiment of the present invention. For ease of understanding the invention, like components relative to the vacuum cleaner A are identified with like reference numbers and letters including a primed (') suffix, and new components are identified using new reference numbers and letters. Except as otherwise noted herein, and as is apparent from the drawings, the vacuum cleaner A' is identical to the vacuum cleaner A.

Figure 19:
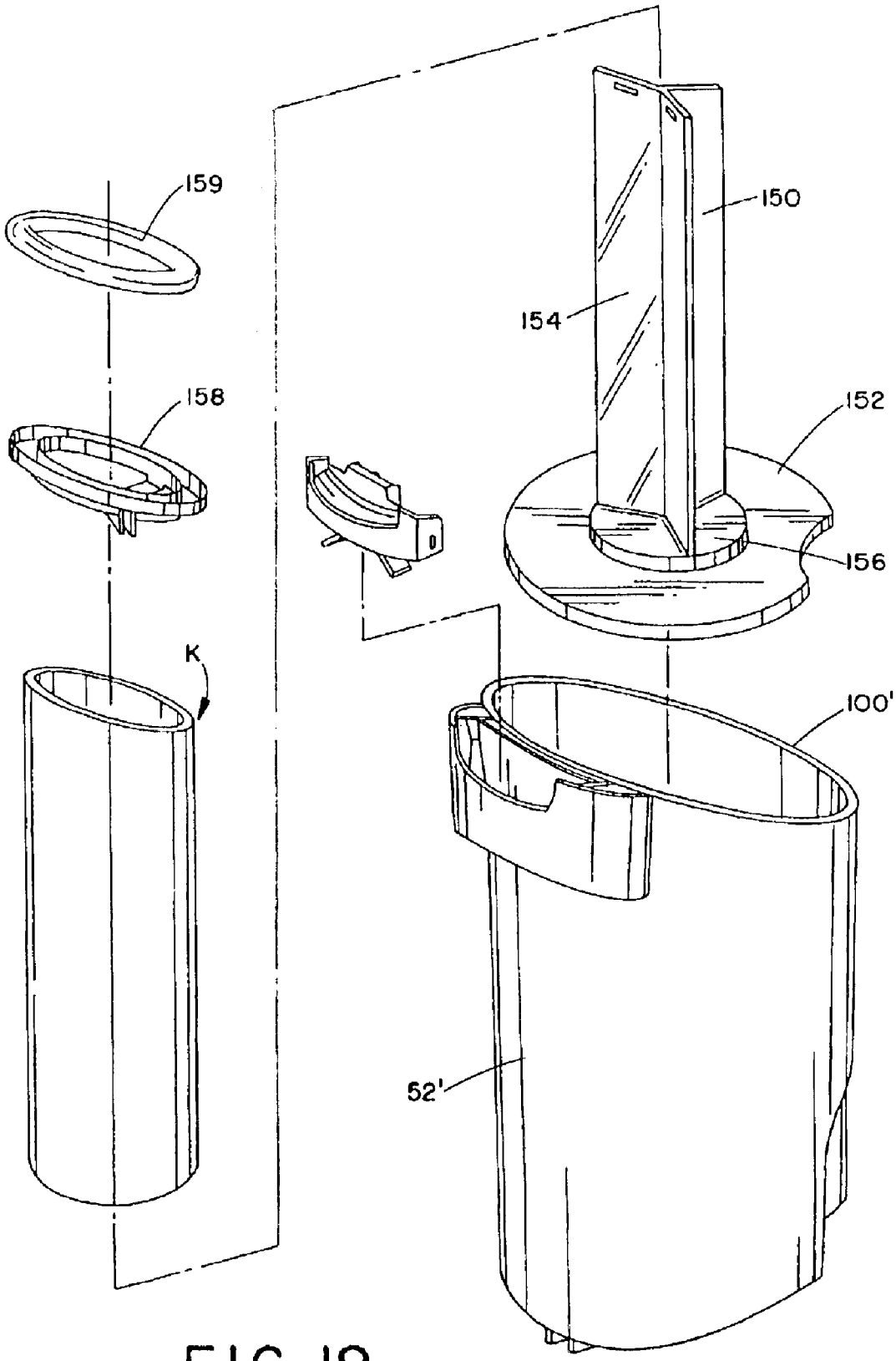
FIG. 19 is an exploded perspective view of a dirt cup, filter and filter mount means as employed in the vacuum cleaner of FIG. 15.
Figure 20:
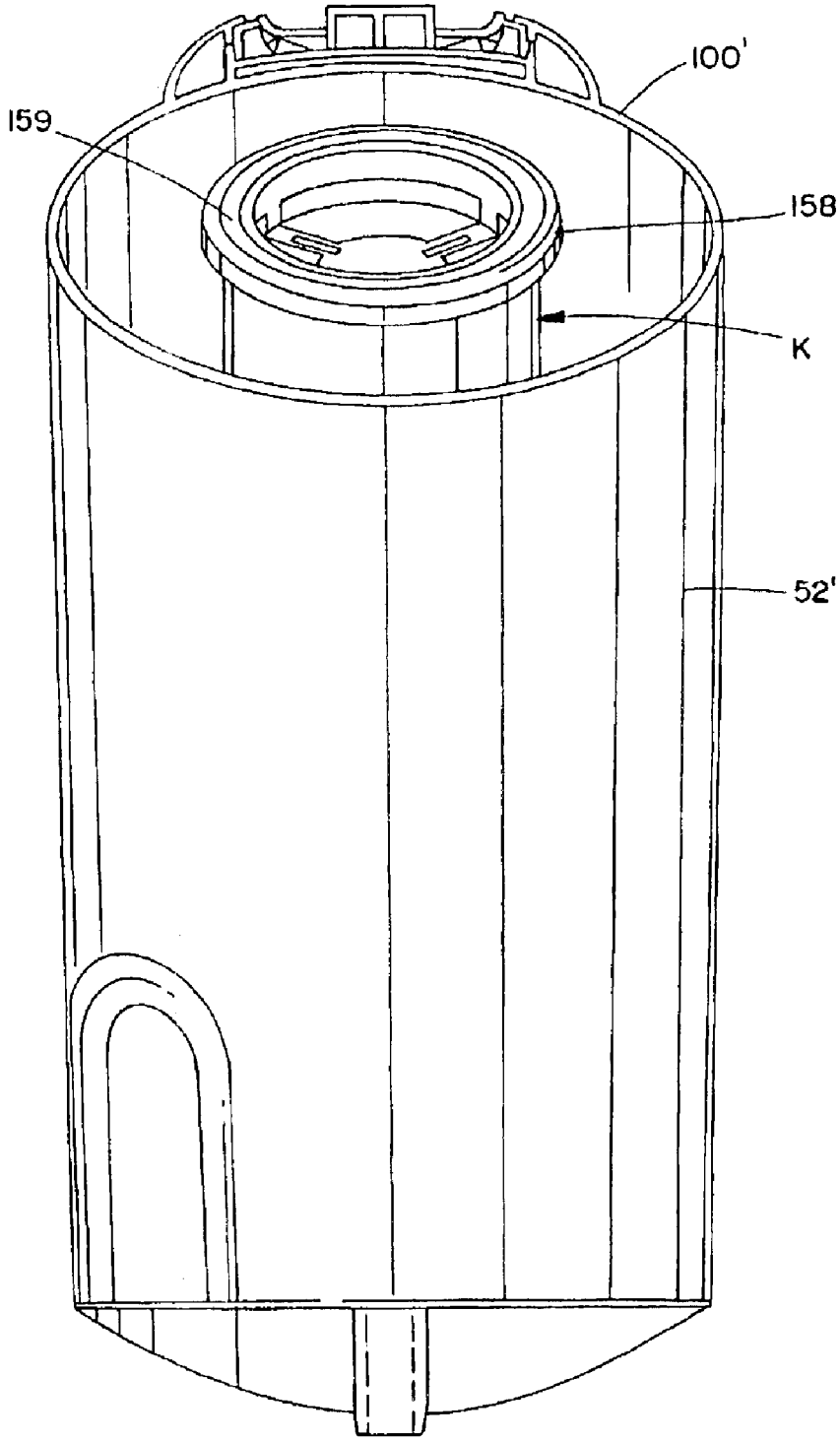
FIG. 20 is a rear elevational view of the dirt cup, filter and filter mount means of FIG. 19 in an assembled condition.

In particular, the vacuum cleaner A' includes a modified cyclonic airflow dust and dirt separating region G'. As with the vacuum cleaner A, the cyclonic airflow region G' includes a cyclonic airflow chamber 54' defined by an upper, fixed housing member 50a' and a lower dirt cup or container 52' which is previously and releasably connected to the upper housing B' of the vacuum cleaner via a hinge assembly 90'. With reference now to FIG. 19, the dirt cup 52' includes a main filter support such as a post, stem, or like structure 150 extending upwardly from a floor or base 152 thereof. The post 150 is positioned in a central region of the cyclonic airflow chamber 54'. A hollow cylindrical main filter element K is positioned over the main filter support 150.

The filter element K is engaged in an interference fit with vanes 154 and a dime-like plateau 156 located on the floor 152 of the filter support so that the filter is releasably, yet securely, retained in its operative position as shown herein, even when the dirt cup 52' is removed from the vacuum cleaner and inverted for purposes of emptying the contents thereof. A filter locking means 158, accommodating a gasket 159, is providing along the uppermost edge of the main filter element K. The main filter element K extends upwardly from the dirt cup floor 152 to a level approximately equal to an upper edge 100' of the dirt cup 52'. Most preferably, as shown herein, the uppermost edge of the main filter element K is also sloped in the same manner as is the dirt cup upper edge 100'. Over the entire height of the dirt cup 52', an annular cyclonic airflow passage is defined between the main filter support and the dirt cup 52'.

It should be apparent from a comparison of FIGS. 19 and 15 that the base 152 serves as the base of the dirt cup 52'. To this end, the base 152 is suitably secured by conventional means to the side walls forming the dirt cup.

The main filter element K preferably comprises the same filter media as the filters H,H'. As shown herein , the filter element K is purely cylindrical in shape, but those skilled in the art will recognize that the filter element K may also be formed with a convoluted or other irregular shape to increase its surface area and efficiency.

Figure 16:
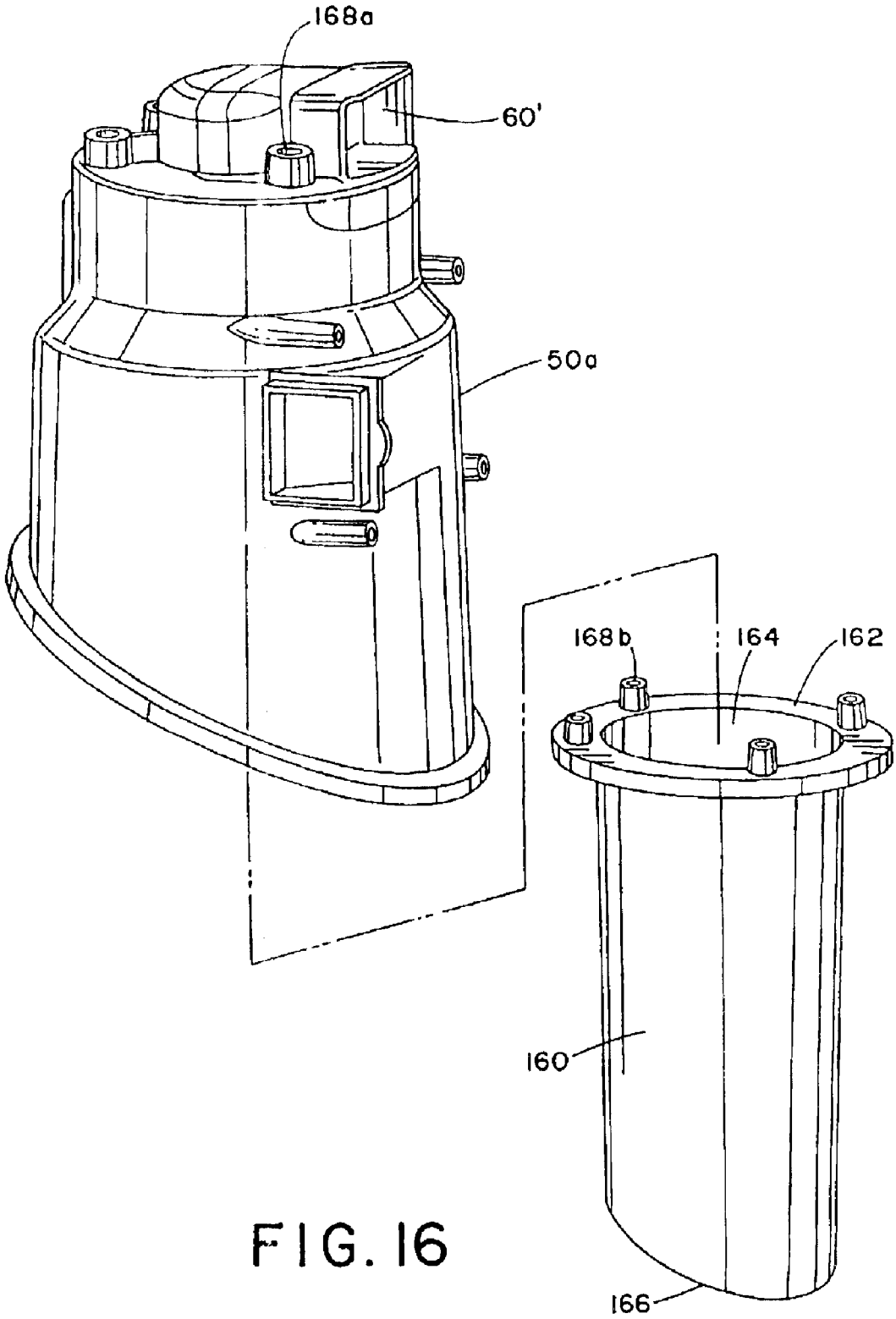
FIG. 16 is an exploded perspective view of an upper housing member and associated upper conduit of the vacuum cleaner of FIG. 15.
Figure 17:
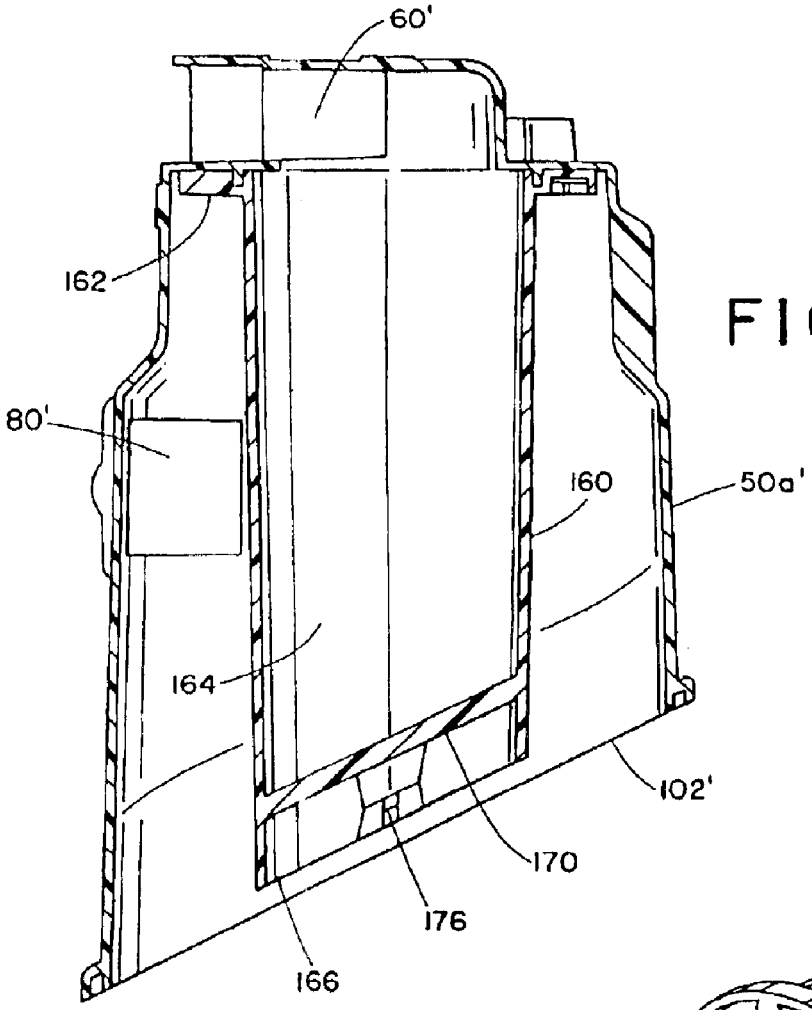
FIG. 17 is a cross-sectional view of the upper housing member and conduit of FIG. 16.
Figure 18:
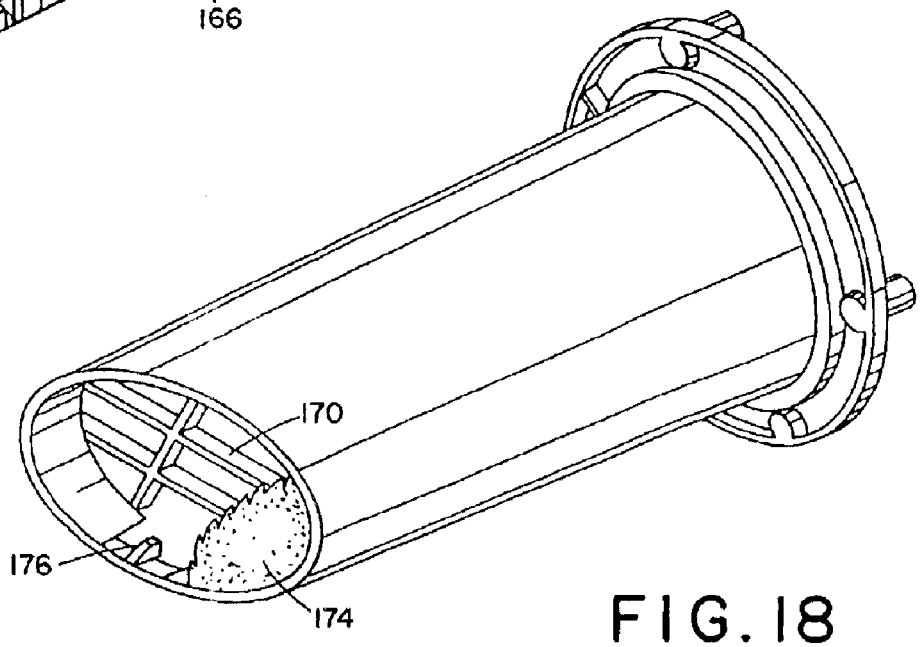
FIG. 18 is a perspective view of the upper conduit of FIG. 16.

Referring now also to FIGS. 16–18, the upper housing member 50a' includes an upper conduit 160 depending centrally from a top wall 162. The upper conduit 160 is preferably a hollow cylindrical member with a passage 164 extending therethrough. The passage 164 is in fluid communication with the suction airstream outlet passage 60' through which the suction airflow J' exits the cyclonic airflow chamber 54'. The upper conduit 160 projects downwardly from the top wall 162 so that the lowermost edge 166 thereof is approximately equal to the level of the lower edge 102' of the conduit member 50α'. Also, the lower edge 166 is sloped in a manner that corresponds to the slope of the housing member lower edge 102'. The upper conduit 160 is connected to the upper housing member 50α' by any suitable means such as fasteners engaged in aligned bores 168a,168b (FIG. 16) respectively formed in the housing member 50a' and conduit 160. As mentioned, the gasket 159 is provided along the joint between the lowermost edge 166 of the upper conduit 160 and the upper edge of the filter K.

With reference now specifically to FIG. 18, an open or airstream permeable auxiliary filter support grid or framework 170 is provided, preferably in the region of the lower edge 166 of the conduit 160. The open filter support 170 provides a backing member for a foam, paper, or similar conventional auxiliary filter element 174 that removes any residual dust and dirt from the suction airstream J' prior to its exit of the cyclonic airflow chamber 54' through the outlet passages 164 and 60'. In case there is a break in the seal between the filter K, and the conduit 160, the auxiliary filter 174 will prevent dirt or dust from being sucked into the motor of the vacuum cleaner. One or more tabs or teeth 176 project radially inwardly from the conduit 160 in the region of the framework 170 to engage the auxiliary filter element 174 so that the filter element is secured adjacent the framework 170 and will not be dislodged from its operative position by the force of gravity.

As is most readily apparent in FIG. 15, the main filter element K and the upper conduit 160 together define a cylindrical column extending through the center of the cyclonic airflow chamber 54' between the floor 152 and top wall 162. This preferred cylindrical column shape also results from the filter element K and the upper conduit 160 having substantially the same outside diameter.

As the suction airstream J' enters the cyclonic chamber 54' through the tangential inlet 80', it travels downwardly in a cyclonic fashion so that dust and dirt entrained in the suction airstream are separated therefrom and collected in the dirt cup 52' (as indicated at L). The suction airstream J' then passes through the main filter element K to remove residual contaminants therefrom, and moves upwardly through the main filter element K, through the auxiliary filter element 174, and into the outlet passage 164. The airstream J' is prevented from bypassing the main filter element K by the gasket 156 positioned between the filter element K' and the conduit 160. The airstream J' then exits the cyclonic airflow chamber 54' through the outlet passage 60' and continues as described in relation to the vacuum cleaner A.

The position of the main filter element K, extending upwardly from the floor 152, is highly desirable given that, as dust and dirt L are collected, at least a portion M of the suction airstream passes through the accumulated dust and dirt L. The accumulation of dust and dirt L seems to act as another filter element which filters more dust and dirts from the airstream M. Also, the flow of the suction airstream M downwardly through the accumulated dust and dirt L acts to compact the dust and dirt L downwardly toward the floor 152 so that the capacity of the dirt cup 52' is efficiently utilized to extend the time before the dirt cup 52' must be emptied.

The invention has been described with reference to the preferred embodiments. Obviously, modification and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A vacuum cleaner comprising:

a housing having a cyclonic airflow chamber for separating contaminants from a suction airstream, said housing including a floor, a top wall, a suction airstream inlet, and a suction airstream outlet, said airstream inlet and said airstream outlet being in fluid communication with said cyclonic airflow chamber;

a suction opening defined on said housing, said suction opening being fluidically connected with said airstream inlet;

an airstream suction source located on said housing, said suction source having an inlet fluidically connected to said airstream outlet and a suction source exhaust outlet, said suction source selectively establishing and maintaining a suction airstream from said suction opening to said suction source exhaust outlet;

a main filter support upwardly from the floor of the housing for releasably accruing a main filter element centrally in said cyclonic airflow chamber;

a main filter element secured to said main filter support; and, a dirt cap selectively positioned in said housing, said main filter element being positioned in said dirt cup.

2. The vacuum cleaner of claim 1 further comprising an upper conduit depending from said top wall and including an outlet passage therethrough in communication with the suction airstream outlet of said housing, said upper conduit including a lower edge adapted for scalingly engaging the main filter element so that said upper conduit and said main filter element together define a column extending between said floor and said top wall of said housing, whereby a suction airstream passing through said cyclonic airflow chamber from said suction airstream inlet to said suction airstream outlet passes through the main filter element, into said upper conduit, and exits and chamber through said suction airstream outlet.

3. The vacuum cleaner as set forth in claim 1 wherein said main filter element comprises high-density polyethylene porous filter media having pores with an average pore size of approximately 45 $\mu$m to approximately 90 $\mu$m.

4. The vacuum cleaner as set forth in claim 1 wherein said housing is defined by an upper housing member, wherein said upper housing member includes said top wall and an upper conduit depending from said top wall, and said dirt cup.

5. The vacuum cleaner of claim 4 wherein said dirt cup is pivotable between a closed, operative position and an open position, said dirt cup including said floor, said filter element extending upwardly from the floor and including an upper edge at a level substantially equal to an upper edge of the dirt cup, and said upper conduit depending downwardly and including a lower edge at a level substantially equal to the upper edge of said dirt cup, said vacuum cleaner further comprising a gasket disposed between said filter element upper edge and said lower edge of said upper conduit so that said main filter element and said lower edge of the upper conduit sealingly mate in an airtight manner when said dirt cup is in the closed, operative position, wherein said upper edge of said dirt cup is defined by an inclined edge such that when said dirt cup is pivoted fully into the open position, the inclined upper edge is located in a substantially horizontal plane to inhibit spillage of the separated dirt and dust.

6. The vacuum cleaner as set forth in claim 2 further comprising an auxiliary filter element positioned in said upper conduit, said auxiliary filter element being so positioned that airflow exiting said cyclonic airflow chamber through said upper conduit passes therethrough and is filtered of residual dust and dirt; and, an auxiliary filter support framework extending across an outlet passage declined in said upper conduit for supporting said auxiliary filter element in a blocking relationship relative in said outlet passage of said upper conduit.

7. The vacuum cleaner as set forth in claim 1 further comprising a final filter assembly positioned on the vacuum cleaner, said final filter assembly being in fluid communication with said suction source exhaust outlet for filtering said suction airstream exhausted from said suction source exhaust outlet and for discharging said suction airstream into the atmosphere.

8. The vacuum cleaner as set forth in claim 7 wherein said final filter assembly comprises a high efficiently particulate arrest (HEPA) filter media.

9. An upright vacuum cleaner comprising:

an upright housing section including a handle;

a nozzle base section hingedly interconnected with the upright housing section, said nozzle base section including a main suction opening formed in an underside thereof;

a cyclonic airflow chamber defined in said upright housing section for separating dust and dirt from a suction airstream;

a suction source located in one of said upright housing section and said nozzle base section and having a suction airflow inlet in fluid communication with said cyclonic airflow chamber and a suction airflow outlet; and, a main filter element located in said cyclonic chamber upstream from said suction source for filtering residual dust and dirt from a suction airstream passing through said cyclonic airflow chamber, said main filter element extending upwardly within said cyclonic airflow chamber from a floor of said housing section, wherein a lower portion of said cyclonic airflow chamber is defined by a dirt container for receiving and retaining dirt and dust separated from said suction airstream.

10. The upright vacuum cleaner as set forth in claim 9 further comprising a final filter assembly located on one of said housing and said nozzle base, said final filter assembly being connected in fluid communication with said suction airflow outlet of said suction source for filtering said suction airstream exhausted by said suction source prior to said suction airstream being dispersed into the atmosphere, wherein said final filter assembly comprises a high efficiency particulate arrest (HEPA) filter media.

11. The upright vacuum cleaner as set forth in claim 9 wherein said main filter element comprises porous high-density polyethylene filter media.

12. The upright vacuum cleaner as set forth in claim 11 wherein said porous filter media has pores with an average pore size of less than approximately 90 $\mu$m.

13. The upright vacuum cleaner as set forth in claim 11 further comprising an upper conduit depending from a top wall of said upright housing section, wherein said upper conduit includes an outlet passage formed therethrough in fluid communication with a suction airstream outlet of said cyclonic airflow chamber, said main filter element secured in a blocking relation with said outlet passage of said upper conduit so that said suction airstream passes through said main filter element prior to existing said cyclonic airflow chamber.

14. The upright vacuum cleaner as set forth in claim 13 wherein said upper conduit includes an auxiliary filter positioned in said outlet passage for filtering residual dust and dirt from the suction airstream after the suction airstream passes through said main filter element.

15. The upright vacuum cleaner as set forth in claim 13 wherein an upper end of said main filter element is sealingly engaged with a lower end of said upper conduit.

16. A vacuum cleaner comprising:

a nozzle section;

a housing section connected to said nozzle section and in fluid communication with said nozzle section;

a cyclonic airflow chamber located in said housing section for separating dirt and dust from a suction airstream flowing into said housing section between an inlet located at a periphery of said housing section and an outlet located along a longitudinal centerline of said housing section;

an upper conduit depending from a top wall of said cyclonic airflow chamber and including a passage therein in communication with said outlet of said housing section; and, a main filter element extending upwardly from a floor of said cyclonic airflow chamber in a central portion of said chamber so that an annulus is defined between said main filter element and the housing portion defining said chamber, said main filter element sealingly engaged with said passage in said upper conduit and adapted for filtering residual dust and dirt from said suction airstream prior to said suction airstream exiting said cyclonic airflow chamber.

17. The vacuum cleaner of claim 16 wherein said housing section comprises a dirt container defining a lower portion of said cyclonic airflow chamber and adapted for receiving and retaining dirt and dust separated from said suction airstream, said container being pivotable between an operative position and an open position and including an open upper end defined by an inclined edge such that when said dirt container is pivoted fully into the open position, the inclined edge is located in a substantially horizontal plane to inhibit spillage of the separated dirt and dust.

18. The vacuum cleaner as set forth in claim 16 further comprising:

a main suction opening located in said nozzle section and connected to a suction airstream inlet of said cyclonic chamber; and, a suction source located on said housing section, and connected to said outlet thereof, for suctioning an airstream from said nozzle main suction opening into and through said cyclonic chamber to an exhaust outlet of said suction source.

19. The vacuum cleaner as set forth in claim 18 further comprising a final filter chamber connected to said exhaust outlet of said suction source and a final filter element for filtering contaminants from said airstream exhausted by said suction source.

20. The vacuum cleaner as set forth in claim 19 wherein said final filter element comprises high efficiency particulate arrest filter media.

21. The vacuum cleaner as set forth in claim 16 wherein said main filter element comprises high density polyethylene porous filter media having an average pore size of approximately 45 $\mu$m to approximately 90 $\mu$m.

22. The vacuum cleaner as set forth in claim 16 wherein a portion of said suction airstream in said cyclonic airflow chamber passes through accumulated dust and dirt separated from said suction airstream so that said accumulated dust and dirt acts as a filter media to separate residual dust and dirt from said portion of said suction airstream prior to said portion of said suction airstream passing through said main filter element.

*23. A vacuum cleaner comprising:*

*a body section having a cyclonic airflow chamber for separating contaminants from a suction airstream;*

*a suction opening communicating with said body section, said suction opening being fluidly connected to said cyclonic airflow chamber;*

*a main filter housing connected to said body section, said main filter housing being located within said cyclonic airflow chamber;*

*a filter element mounted in said main filter housing, wherein said main filter housing comprises a plurality of apertures so that an airstream can flow from said cyclonic airflow chamber into said main filter housing; and,*

*an airstream suction source located on said body section, and suction source communicating with said main filter housing.*

*24. The vacuum cleaner of claim 23, wherein at least a portion of said main filter housing is selectively detachable from said body section.*

*25. The vacuum cleaner of claim 24, wherein said filter element is selectively retained within said at least a portion of said main filter housing.*

*26. The vacuum cleaner of claim 24, wherein said at least a portion of said main filter housing comprises at least one tab extending therefrom, wherein said at least one tab of said at least a portion of said main filter housing cooperates with adjacent elements mounted on said body section to secure said at least a portion of said main filter housing to said body section.*

*27. The vacuum cleaner of claim 24, wherein said main filter housing comprises an airflow outlet which communicates with said airstream suction source.*

*28. The vacuum cleaner of claim 23, wherein said filter element is approximately frusto-conical in shape.*

*29. The vacuum cleaner of claim 23, wherein said filter element comprises a thermoplastic material.*

*30. The vacuum cleaner of claim 23, wherein said main filter housing comprises a closed bottom end.*

*31. The vacuum cleaner of claim 30, wherein said bottom end of said main filter housing has a diameter that is larger than is a diameter of an adjacent portion of said main filter housing.*

*32. A vacuum cleaner comprising:*

*a nozzle base;*

*an upright body section pivotably mounted on said nozzle base;*

*a cyclonic airflow chamber defined in said upright body section, wherein said cyclonic airflow chamber comprises an airflow inlet and an airflow outlet;*

*a suction opening defined in said nozzle base, said suction opening being fluidly connected with said airflow inlet of said cyclonic chamber;*

*an airstream suction source located on one of said nozzle base and said upright body section, said suction source having an inlet fluidly connected to said airflow outlet of said cyclonic chamber and an exhaust outlet;*

*a main filter housing connected to said upright body section, said main filter housing being located within said cyclonic airflow chamber; and,*

*a filter element mounted in said main filter housing, wherein said main filter housing comprises a plurality of apertures so that an airstream can flow from said cyclonic airflow chamber into said main filter housing.*

*33. The vacuum cleaner of claim 32, wherein said airflow outlet of said cyclonic airflow chamber is coaxial with a longitudinal axis of said cyclonic airflow chamber.*

*34. The vacuum cleaner of claim 32, wherein said filter element is substantially coaxial with a longitudinal axis of said cyclonic airflow chamber.*

*35. The vacuum cleaner of claim 32, wherein said airflow inlet of said cyclonic airflow chamber is tangential to a longitudinal axis of said cyclonic airflow chamber.*

*36. The vacuum cleaner of claim 32, further comprising a conduit fluidly connecting said suction opening of said nozzle base with said airflow inlet of said cyclonic airflow chamber.*

*37. The vacuum cleaner of claim 32, wherein at least a portion of said main filter housing is selectively detachable from said upright body section.*

*38. The vacuum cleaner of claim 37, wherein said filter element is selectively retained within said at least a portion of said main filter housing.*

*39. The vacuum cleaner of claim 32, wherein said main filter housing comprises an airflow outlet which communicates with said airstream suction source.*

*40. The vacuum cleaner of claim 32, wherein said filter element is approximately frusto-conical in shape.*

*41. The vacuum cleaner of claim 32, wherein said filter element comprises a thermoplastic material.*

*42. A vacuum cleaner comprising:*

*a body section having a cyclonic airflow chamber for separating contaminants from a suction airstream;*

*a suction opening defined on said body section, said suction opening being located upstream from said cyclonic airflow chamber and communicating therewith;*

*an airstream suction source located on said body section, said suction source being located downstream from said cyclonic airflow chamber and communicating therewith;*

*a main filter housing located within said cyclonic airflow chamber; and,*

*a filter element mounted in said main filter housing, wherein said main filter housing comprises a plurality of apertures so that an airstream can flow from said cyclonic airflow chamber through said filter element and toward said airstream suction source.*

*43. The vacuum cleaner of claim 42, further comprising a dirt cup, wherein said cyclonic airflow chamber is at least partially located within said dirt cup.*

*44. The vacuum cleaner of claim 43, wherein said main filter housing is arranged substantially coaxial with a longitudinal axis of said dirt cup.*

*45. The vacuum cleaner of claim 42, wherein said main filter housing is arranged substantially coaxial with a longitudinal axis of said cyclonic airflow chamber.*

*46. The vacuum cleaner of claim 42, wherein said cyclonic airflow chamber comprises an airflow outlet which is substantially coaxial with a longitudinal axis of said cyclonic airflow chamber.*

*47. The vacuum cleaner of claim 42, wherein said cyclonic airflow chamber comprises an airflow inlet which is substantially tangential to a longitudinal axis of said cyclonic airflow chamber.*

*48. The vacuum cleaner of claim 47, further comprising a conduit fluidly connecting said suction opening of said body section with said cyclonic airflow chamber.*

*49. The vacuum cleaner of claim 42, wherein said filter element is approximately frusto-conical in shape.*

*50. The vacuum cleaner of claim 49, wherein said filter element comprises a thermoplastic material.*

*51. The vacuum cleaner of claim 42, wherein at least a portion of said main filter housing is selectively detachable from said body section, thereby allowing access to said filter element.*

*52. A vacuum cleaner comprising:*

*a body section having a cyclonic airflow chamber defined therein;*

*a suction opening defined on said body section, said suction opening being located upstream from said cyclonic airflow chamber and communicating therewith;*

*a main filter housing located within said cyclonic airflow chamber;*

*a filter element selectively mounted in said main filter housing a wherein said filter element and said main filter housing cooperate to define a tortous airflow path; and,*

*an airstream suction source located on said body section, said suction source being located downstream from said cyclonic airflow chamber and communicating therewith.*

*53. The vacuum cleaner of claim 52, wherein said cyclonic airflow chamber comprises an airflow outlet, wherein said main filter housing is located adjacent said airflow outlet.*

*54. The vacuum cleaner of claim 53, wherein said main filter housing comprises a plurality of apertures so that an airstream can flow from said cyclonic airflow chamber into said main filter housing, through said filter element and toward said airstream suction source.*

*55. The vacuum cleaner of claim 53, wherein said airflow outlet of said cyclonic airflow chamber is substantially coaxial with a longitudinal axis of said cyclonic airflow chamber.*

*56. The vacuum cleaner of claim 52, further comprising a dirt cup mounted in said body section, wherein said cyclonic airflow chamber is at least partially located with said dirt cup.*

*57. The vacuum cleaner of claim 56, wherein said main filter housing is arranged substantially coaxial with a longitudinal axis of said dirt cup.*

*58. The vacuum cleaner of claim 52, wherein said main filter housing is arranged substantially coaxial with a longitudinal axis of said cyclonic airflow chamber.*

*59. The vacuum cleaner of claim 52, wherein said cyclonic airflow chamber comprises an airflow inlet, said airflow inlet being substantially tangential to a longitudinal axis of said cyclonic airflow chamber.*

*60. The vacuum cleaner of claim 52, wherein at least a portion of said main filter housing is selectively detachable from said body section.*

*61. The vacuum cleaner of claim 60, wherein said at least a portion of said main filter housing comprises tabs and is rotated to selectively detach said at least a portion of said main filter housing from said body section.*

*62. The vacuum cleaner of claim 60, wherein said filter element is selectively held in said at least a portion of said main filter housing.*

*63. The vacuum cleaner of claim 52, wherein said filter element is approximately frusto-conical in shape.*

*64. The vacuum cleaner of claim 63, wherein said filter element comprises a thermoplastic material.*

*65. The vacuum cleaner of claim 52, wherein said main filter housing comprises a closed bottom end.*

* * * * *